US012722273B1

(12) United States Patent
Hurt et al.

(10) Patent No.: US 12,722,273 B1
(45) Date of Patent: Sep. 1, 2026

(54) HAND TOOL WITH EXTERNAL JAM NUT AND INTERNAL RAMPED CYLINDRICAL COMPRESSION WEDGE

(71) Applicants: Patricia Hurt, Saint Cloud, MN (US); Daniel P. Hurt, Saint Cloud, MN (US)

(72) Inventors: Patricia Hurt, Saint Cloud, MN (US); Daniel P. Hurt, Saint Cloud, MN (US)

( * ) Notice: Subject to any disclaimer, the term of this patent is extended or adjusted under 35 U.S.C. 154(b) by 323 days.

(21) Appl. No.: 18/523,822

(22) Filed: Nov. 29, 2023

Related U.S. Application Data

(60) Provisional application No. 63/385,390, filed on Nov. 29, 2022.

(51) Int. Cl.
*B25G 3/26* (2006.01)

(52) U.S. Cl.
CPC .................................... *B25G 3/26* (2013.01)

(58) Field of Classification Search
CPC .................................... B25G 3/00; B25G 3/26
USPC ........................................................... 81/489
See application file for complete search history.

(56) References Cited

U.S. PATENT DOCUMENTS

| | | | |
|---|---|---|---|
| 61,784 | A | 2/1867 | Wheat |
| 157,634 | A | 12/1874 | Reagan |
| 161,678 | A | 4/1875 | Gardner |
| 184,918 | A | 11/1876 | Siddall |
| 239,126 | A | 3/1881 | Wagner |
| 245,542 | A | 8/1881 | Moran |
| 264,527 | A | 9/1882 | Haley |
| 264,798 | A | 9/1882 | Tyler |
| 296,879 | A | 4/1884 | Scollay |
| 309,437 | A | 12/1884 | Calef |
| 347,054 | A | 8/1886 | Morse |
| 378,540 | A | 2/1888 | Brough |
| 407,571 | A | 7/1889 | Calef |
| 479,661 | A | 7/1892 | Poulson |
| 572,851 | A | 12/1896 | Young |
| 577,220 | A | 2/1897 | Whitehead |
| 581,260 | A | 4/1897 | Biddle |
| 606,534 | A | 6/1898 | Gifford |
| 615,793 | A | 12/1898 | Bowman |
| D31,050 | S | 6/1899 | Witt |
| 661,253 | A | 11/1900 | Zimmerman |
| 693,100 | A | 2/1902 | Bell |
| 712,843 | A | 11/1902 | Paul |
| 781,772 | A | 2/1905 | Gifford |
| 843,590 | A | 2/1907 | Dunn, Jr. |

(Continued)

*Primary Examiner* — Katina N. Henson
(74) *Attorney, Agent, or Firm* — Albert W. Watkins

(57) ABSTRACT

A hand tool has end coupled handle segments. A fastener extends into a first coupler half that has an internal ramped cylindrical compression wedge. The fastener runs parallel to the handle segment and shortens the wedge in the direction of the fastener longitudinal axis, while driving the wedge radially outward therefrom to secure to the handle segment. A second coupler half engages to the first. The second coupler half includes: a coupling face that extends in a plane transverse to the handle longitudinal axis; and a threaded post protruding perpendicular to the plate. A tool implement head has a coupling face that is placed adjacent the second coupler half coupling face, with the threaded post passing through the tool implement head. A jam nut manually threads onto the threaded post, and applies force to secure the tool implement head between the jam nut and first coupler half coupling face.

13 Claims, 10 Drawing Sheets

(56) References Cited

U.S. PATENT DOCUMENTS

| | | | |
|---|---|---|---|
| 930,660 | A | 8/1909 | Gifford |
| 931,838 | A | 8/1909 | Beehler |
| 969,528 | A | 9/1910 | Disbrow |
| 1,027,345 | A | 5/1912 | Lapin |
| 1,200,925 | A | 10/1916 | Delamere |
| 1,443,596 | A | 1/1923 | Schaefer |
| 1,482,858 | A | 2/1924 | Nich et al. |
| 1,503,251 | A | 7/1924 | Schoof |
| 1,529,835 | A | 3/1925 | Hamilton |
| 1,609,414 | A | 12/1926 | Lenny |
| 1,629,041 | A | 5/1927 | Minier |
| 1,644,881 | A | 10/1927 | Hokanson |
| 1,648,354 | A | 11/1927 | Lied |
| 1,776,434 | A | 9/1930 | Hokanson |
| 1,790,466 | A | 1/1931 | Gordon |
| 1,851,426 | A | 3/1932 | Haskell |
| 1,858,380 | A | 5/1932 | Stoddard |
| 1,877,125 | A | 9/1932 | Casper |
| 1,901,778 | A | 3/1933 | Schlag |
| 2,070,768 | A | 2/1937 | Wright |
| 2,116,928 | A | 5/1938 | Hanneman |
| 2,168,121 | A | 8/1939 | French |
| 2,279,324 | A | 4/1942 | Julien |
| 2,463,621 | A | 3/1949 | Herzog |
| 2,536,607 | A | 1/1951 | Jenkins |
| 2,567,565 | A | 9/1951 | Keeler et al. |
| D170,892 | S | 11/1953 | Schoenwald |
| 2,699,353 | A | 1/1955 | Nagy et al. |
| 2,724,610 | A | 11/1955 | Fitzgerald |
| 2,737,060 | A | 3/1956 | Russell |
| 2,951,482 | A | 9/1960 | Sullivan |
| 3,014,750 | A | 12/1961 | Briggs |
| 3,024,031 | A | 3/1962 | Davidson |
| 3,155,414 | A | 11/1964 | Bales |
| 3,222,699 | A | 12/1965 | Zeisig |
| 3,226,149 | A | 12/1965 | McJohnson |
| 3,268,968 | A | 8/1966 | Crickmer |
| 3,372,509 | A | 3/1968 | Arsenault |
| 3,372,510 | A | 3/1968 | Arsenault |
| D215,081 | S | 9/1969 | Zagwyn |
| 3,549,189 | A | 12/1970 | Alosi |
| 3,751,804 | A | 8/1973 | Pulrang |
| 3,949,817 | A | 4/1976 | Rice |
| D240,678 | S | 7/1976 | Herig |
| 4,128,266 | A | 12/1978 | Vaslas |
| 4,129,327 | A | 12/1978 | Moore, Jr. |
| D251,566 | S | 4/1979 | Moen |
| 4,147,348 | A | 4/1979 | Lee |
| 4,155,582 | A | 5/1979 | Reisner |
| 4,197,764 | A | 4/1980 | Auernhammer |
| 4,263,690 | A | 4/1981 | Dobosi |
| 4,264,096 | A | 4/1981 | Barnett |
| 4,265,475 | A | 5/1981 | Jarvis |
| 4,280,727 | A | 7/1981 | Germain |
| 4,378,718 | A | 4/1983 | Kraft et al. |
| 4,387,483 | A | 6/1983 | Larrabee |
| 4,471,842 | A | 9/1984 | Fox |
| 4,477,114 | A | 10/1984 | Callis |
| 4,495,669 | A | 1/1985 | Hooper |
| 4,537,433 | A | 8/1985 | Yang |
| 4,548,092 | A | 10/1985 | Strong, Jr. |
| 4,549,611 | A | 10/1985 | Mills |
| D281,393 | S | 11/1985 | Karnhag et al. |
| D283,743 | S | 5/1986 | Moser |
| 4,615,553 | A | 10/1986 | Hultine |
| 4,635,429 | A | 1/1987 | Cornelius |
| 4,644,740 | A | 2/1987 | Lee |
| 4,653,142 | A | 3/1987 | Upton |
| 4,690,447 | A | 9/1987 | Adams |
| 4,704,758 | A | 11/1987 | Hoffman |
| 4,730,632 | A | 3/1988 | Mace |
| 4,787,661 | A | 11/1988 | Rutledge |
| 4,791,780 | A | 12/1988 | Phillips |
| D300,713 | S | 4/1989 | Trapasso |
| 4,822,087 | A | 4/1989 | DeCarlo |
| D303,068 | S | 8/1989 | Zabarte |
| 4,888,846 | A | 12/1989 | Natale |
| 4,930,181 | A | 6/1990 | Johnson |
| 4,951,956 | A | 8/1990 | Vittone |
| 4,958,407 | A | 9/1990 | Johnson |
| 5,014,792 | A | 5/1991 | Gierloff |
| 5,065,475 | A | 11/1991 | Watt |
| 5,133,101 | A | 7/1992 | Hauser et al. |
| 5,133,582 | A | 7/1992 | Rocha |
| 5,145,210 | A | 9/1992 | Lennon |
| D334,525 | S | 4/1993 | Adams |
| D339,731 | S | 9/1993 | Stewart |
| D339,732 | S | 9/1993 | Stewart |
| D360,123 | S | 7/1995 | Shu |
| 5,451,085 | A | 9/1995 | Wagner |
| 5,493,758 | A | 2/1996 | Carmien |
| 5,496,085 | A | 3/1996 | Middleton |
| 5,522,629 | A | 6/1996 | Loo |
| 5,529,357 | A | 6/1996 | Hoffman |
| 5,533,768 | A | 7/1996 | Mitchell |
| 5,544,935 | A | 8/1996 | Cone, II et al. |
| D373,944 | S | 9/1996 | Thompson et al. |
| 5,581,915 | A | 12/1996 | Lobato |
| D377,300 | S | 1/1997 | Fredrick von Essen |
| 5,595,532 | A | 1/1997 | McCracken |
| 5,606,772 | A | 3/1997 | Ilic |
| 5,651,581 | A | 7/1997 | Myers et al. |
| D387,263 | S | 12/1997 | Bidstrup et al. |
| 5,695,231 | A | 12/1997 | Hoffman |
| D388,684 | S | 1/1998 | Irwin |
| 5,771,535 | A | 6/1998 | Blessing |
| D396,624 | S | 8/1998 | Basilius |
| 5,787,588 | A | 8/1998 | Tisbo et al. |
| 5,799,996 | A | 9/1998 | Fredrickson |
| 5,802,960 | A | 9/1998 | Graj et al. |
| 5,810,408 | A | 9/1998 | Armstrong |
| 5,813,206 | A | 9/1998 | McKittrick |
| 5,830,047 | A | 11/1998 | McCracken |
| D401,833 | S | 12/1998 | Whitehead et al. |
| 5,926,895 | A | 7/1999 | Roy |
| 5,937,627 | A | 8/1999 | McKittrick |
| 5,943,796 | A | 8/1999 | Hedstrom |
| 5,979,005 | A | 11/1999 | Lecce |
| D418,734 | S | 1/2000 | Ritrovato et al. |
| 6,023,924 | A | 2/2000 | Babineau |
| D427,494 | S | 7/2000 | Yacobi |
| 6,101,657 | A | 8/2000 | Hamilton |
| 6,101,909 | A | 8/2000 | Djie |
| 6,122,792 | A | 9/2000 | Roy |
| D432,891 | S | 10/2000 | Sterling |
| 6,168,507 | B1 | 1/2001 | McCracken |
| 6,199,245 | B1 | 3/2001 | Blessing |
| 6,203,081 | B1 | 3/2001 | Kegan, Sr. |
| 6,203,626 | B1 | 3/2001 | Biggs et al. |
| 6,343,822 | B1 | 2/2002 | Badura |
| D459,642 | S | 7/2002 | Haquin |
| 6,434,793 | B1 | 8/2002 | Ensson |
| 6,460,911 | B1 | 10/2002 | Engelsiepen |
| D466,389 | S | 12/2002 | Clivio |
| D468,618 | S | 1/2003 | Ho |
| 6,564,426 | B1 | 5/2003 | Wang |
| 6,601,887 | B2 | 8/2003 | Graves |
| D487,010 | S | 2/2004 | Marquardt et al. |
| 6,725,491 | B2 | 4/2004 | Hung |
| D493,685 | S | 8/2004 | Dallas |
| 6,798,348 | B1 | 9/2004 | Wilker et al. |
| 6,814,156 | B2 | 11/2004 | Dieterle et al. |
| 6,830,271 | B2 | 12/2004 | Piscopo et al. |
| 6,871,377 | B2 | 3/2005 | Veltrop et al. |
| 6,918,240 | B2 | 7/2005 | Hurt |
| D514,917 | S | 2/2006 | Coudurier |
| 7,032,942 | B2 | 4/2006 | Stuart |
| 7,093,667 | B2 | 8/2006 | Hurt |
| D528,398 | S | 9/2006 | Meyer et al. |
| D544,330 | S | 6/2007 | Hurley |
| 7,290,311 | B2 | 11/2007 | Vosbikian et al. |
| 7,331,620 | B2 | 2/2008 | Wang |
| 7,350,839 | B2 | 4/2008 | Marquardt et al. |
| 7,396,187 | B1 | 7/2008 | Meyers |

(56) References Cited

U.S. PATENT DOCUMENTS

| | | | |
|---|---|---|---|
| 7,398,579 B2 | 7/2008 | Moshenrose | |
| D580,732 S | 11/2008 | Meagher et al. | |
| 7,637,882 B2 | 12/2009 | Carman, Jr. et al. | |
| D611,321 S | 3/2010 | Boies et al. | |
| D627,619 S | 11/2010 | Demers et al. | |
| 7,836,557 B2 | 11/2010 | Baker | |
| 7,891,902 B2 | 2/2011 | Pettey | |
| 8,002,322 B2 | 8/2011 | Rathmell et al. | |
| 8,006,351 B2 | 8/2011 | Baker | |
| 8,065,774 B2 | 11/2011 | Schiesz et al. | |
| 8,108,966 B1 | 2/2012 | Viviano | |
| 8,152,396 B2 | 4/2012 | Kuykendall | |
| D668,128 S | 10/2012 | Masalin et al. | |
| D676,723 S | 2/2013 | Norwood et al. | |
| 8,381,358 B1 | 2/2013 | Frey | |
| 8,387,263 B1 | 3/2013 | Roberts | |
| D686,477 S | 7/2013 | Pookrum | |
| 8,511,209 B1 | 8/2013 | Bishop et al. | |
| D690,183 S | 9/2013 | Lee | |
| D697,783 S | 1/2014 | Chesner | |
| 8,640,295 B2 | 2/2014 | Schiesz et al. | |
| 8,683,896 B2 | 4/2014 | Gerbec et al. | |
| 8,714,607 B1 | 5/2014 | Suber | |
| D706,594 S | 6/2014 | Workman et al. | |
| 8,740,272 B2 | 6/2014 | Walden et al. | |
| 8,776,648 B2 | 7/2014 | Lee | |
| 8,832,898 B1 | 9/2014 | Stimach | |
| D716,119 S | 10/2014 | Elston | |
| 9,163,372 B1 | 10/2015 | Elston | |
| 9,498,877 B1 | 11/2016 | Henry | |
| 9,643,311 B1 | 5/2017 | Cowie | |
| 9,731,409 B2 | 8/2017 | Meinzer et al. | |
| 9,757,851 B2 | 9/2017 | Meinzer et al. | |
| 9,889,550 B1 | 2/2018 | McNeny et al. | |
| D825,295 S | 8/2018 | Roberts | |
| 10,161,092 B2 | 12/2018 | Lovell | |
| 11,780,073 B2 | 10/2023 | Hurt | |
| 2003/0116982 A1 | 6/2003 | Nicolay et al. | |
| 2005/0153606 A1 | 7/2005 | Lane et al. | |
| 2013/0193700 A1 | 8/2013 | Walden | |
| 2013/0327191 A1 | 12/2013 | Wason | |
| 2015/0007404 A1* | 1/2015 | Prosser ................ | A46B 5/0075 403/104 |
| 2015/0098822 A1 | 4/2015 | Lee | |
| 2015/0121728 A1 | 5/2015 | Spataro et al. | |
| 2015/0123413 A1 | 5/2015 | Spataro et al. | |
| 2019/0246867 A1 | 8/2019 | Ziamandanis | |
| 2019/0291262 A1 | 9/2019 | Bunker | |
| 2019/0357436 A1 | 11/2019 | Hamilton | |

* cited by examiner

HAND TOOL WITH EXTERNAL JAM NUT AND INTERNAL RAMPED CYLINDRICAL COMPRESSION WEDGE

CROSS REFERENCE TO RELATED APPLICATIONS

The present application claims the benefit of U.S. provisional patent application 63/385,390 filed Nov. 29, 2022 of like inventorship, the teachings and entire contents which are incorporated herein by reference.

BACKGROUND OF THE INVENTION

1. Field of the Invention

The present invention pertains generally to tool and implement handles, and more particularly to a detachable and collapsible handle that may be used with one or a variety of diverse tools and implements.

2. Description of the Related Art

Shovels, rakes, hoes, and many other hand tools and implements have long handles that allow a person to operate the tools and implements from a generally upright stance. This upright stance is more comfortable than leaning over or down, since the load is primarily carried upon an essentially vertically columnar spine which requires the musculature to only provide stabilization or nominal force. The benefit of remaining in an upright stance is especially great when the work is for extended periods, or would otherwise require repetitive bending down and standing back up. In addition to being more comfortable and natural, with an appropriate handle length a person is still postured well to "lean in" to the implement, and gain much body weight advantage to facilitate the task at hand. This can be very important and beneficial for those moments or short periods requiring greater force on the tool or implement, such as digging into the earth with a hoe or breaking packed snow or ice free from a sidewalk with a shovel.

These hand tools and implements ordinarily utilize set screws, nails, rivets, pins, bolts, or other fasteners inserted through the implement head at a ninety-degree angle to the handle longitudinal axis. The fastener passes through the implement head into or even entirely through the handle, to secure the long handle to the implement head. While there are a myriad of such implements known and in use, one exemplary U.S. patent, the teachings which are incorporated herein by reference, is 6,023,924 by Babineau, entitled "Easy grip tool". As shown therein in FIGS. 5 and 6, a set screw 46 is threaded through the implement and engages with the handle.

Unfortunately, the long handle makes it difficult and expensive to ship these implements individually, owing to the large package size. Thus, the common practice is to ship them to a retail outlet in bulk. Even when stacked together, the implements still require substantial shipping and storage space, most of which is simply empty space. Every linear foot of retail shelf space consumed equates to fewer options for products that a consumer will buy, and inventory storage space equates to expense. As a result, the store doesn't want to allocate any extra retail shelf or back room storage space and incur the associated expense or lost revenue to hold excess inventory for these bulkier, relatively low priced products. Nevertheless, for exemplary purposes describing snow shovels, in the event of a major snow storm retail stores will commonly sell out of snow shovels long before the customer demand for snow shovels has been met.

Making matters worse, fasteners that secure an implement head to handle by passing through the implement head into the handle often prematurely break on the implements. The fastener must be of a small diameter, so that the hole needed for the fastener does not detract too much from the strength of the handle in the vicinity of the fastener. However, this small diameter also means that impacts between the handle and implement create great shearing force across the small cross-section or diameter of the fastener. These major shear forces can lead to immediate failure, or work hardening followed by subsequent failure of the fastener, or deformation of the holes that the fastener passes through. As the holes progressively deform more, in either or both of the handle and tool head, more momentum builds in relative motion between the handle and tool head in advance of the next impact. This means that the more the holes wear, the greater the shear force across the fastener and the greater the wear and deformation of the holes.

In some designs, such as the Babineau patent incorporated by reference herein above, the fastener such as a set screw is of a greater diameter, but only passes through the implement head to press against the exterior of the handle. This preserves strength in the elongate handle. However, with this arrangement the fastener will even more quickly loosen relative to the handle, leading to very objectionable wobble, and quickly from there to failure.

Some manufacturers have designed certain product lines to address some of the aforementioned limitations. For example, it is common practice for many large floor brooms to provide male "broom" threads or Acme threads on one end of a long slender handle, and a female like-threaded coupling formed into the brush block. For shipping and storage the handle and brush block are unscrewed from each other, and then the brush block long axis is oriented to align in parallel arrangement with the longitudinal axis of the handle. While the shipping carton must still be slightly longer than the handle length, the overall carton length does not have to add even more length to accommodate the combined length of both the handle and the implement. The carton width is also reduced, from the greatest dimension of implement head down to the next smaller dimension, which in the case of a several foot wide brush block can be substantially smaller. Consequently, this rearrangement for shipping and storage significantly reduces the space required.

While threaded couplings are very common for brooms, the threaded coupling adds manufacturing cost and will allow rotation between the broom head and handle during use. In the case of a broom head, a person can easily twist the broom handle while sweeping to tighten the handle-to-head coupling. However, rotation of an implement head relative to implement handle is undesirable, if not completely unacceptable, for most tools and implements. Consequently, the extra cost and inconvenience of these basic threaded couplings have prevented them from being widely accepted for most other tools and implements.

To further reduce the shipping and storage space required, some resourceful tool and implement manufacturers over the years have split the handle from one long member into two shorter sections. In many of these cases, prior to using the tool or implement the two shorter sections are rejoined longitudinally end-to-end, sometimes with slight overlap, by inserting fasteners perpendicular to the longitudinal axis of the shortened handle sections to securely join them together. Some of these apparatuses also incorporate a reinforcing collar that circumscribes the junction of the two shorter sections, whether the junction is an overlapping one or not, and the fasteners pass through the reinforcing collar. Exemplary U.S. patents, the teachings which are incorporated herein by reference, include: U.S. Pat. No. 572,851 by Young, entitled "Handle Attachment"; U.S. Pat. No. 577,220 by Whitehead, entitled "Extensible broom handle"; U.S. Pat. No. 843,590 by Dunn, entitled "Household Cleaning appliance"; U.S. Pat. No. 2,168,121 by French, entitled "Ceiling and wall cleaner"; U.S. Pat. No. 2,724,610 by Fitzgerald, entitled "Golf ball retriever"; and U.S. Pat. No. 5,493,758 by Carmien, entitled "Extension pole".

Unfortunately, the reinforcing collar fasteners suffer from problems similar to the fasteners used to hold the implement head to handle, including loosening and breaking. When these reinforcing collar fasteners come loose during tool use, the handle will wobble and ultimately split or break, preventing further use of the long-handled tool.

While better than not for most tasks, for some tasks or manipulations the long slender handles can also be ergonomically deficient. Occasionally a tool user is undesirably forced into awkward and relatively weak positions that can lead to great physical stress or injury. This limitation is of course in addition to the shipping and storage challenges faced by prior art tools and implements.

Many artisans over the years have improved the ergonomics of an ordinary long slender shaft-style handle by coupling a secondary grip intermediate along the long handle. This allows a person to both grasp the long handle and also grasp the intermediate grip, which greatly improves the associated ergonomics. While there have been many such grips that, for exemplary and non-limiting purpose, are designed to clamp around an intermediate portion of the long handle, many of these grips can be dangerous to use. In the event of a heavy load or torque placed upon the implement, such as an off-balance heavy shovel, the secondary grip can unexpectedly slip, allowing the shaft to rotate. Likewise, the grip may unexpectedly slide along the longitudinal axis of the shaft. Both of these sudden shifts can lead to sudden unexpected changes in the balance of the load, which very commonly will force a person to reload, clean up, or redo a task. While albeit uncommon, in some instances this sudden unexpected change in the load balance can also very undesirably result in injury.

To reduce the chance of unexpected rotational shifts, a few artisans have devised a second intermediate grip in combination with a non-rotatable long handle. Exemplary U.S. patents, the teachings which are incorporated herein by reference, include: U.S. Pat. Nos. 606,534 and 781, 772, each by Gifford and entitled "Snow Shovel," and both which clamp around a rectangular shaft but which can still slide longitudinally unexpectedly; and Des U.S. Pat. No. 377,300 by Fredrick von Essen, entitled "Two-handled shovel," which bolts a grip through the long-handle, thereby suffering the fatiguing and durability issues of transverse fasteners described herein above. None of these three patents addresses the space limitations for storage and shipping of long handle tools and implements.

U.S. Pat. No. 9,889,550 by McNeny et al, entitled "Step down handle for a hand tool", the teachings which are incorporated herein by reference, discloses an intermediate grip that addresses both ergonomic issues and space limitations for storage and shipping of long handle tools and implements. Nevertheless the McNeny et al handle incorporates transverse fasteners, thereby suffering the fatiguing and durability issues associated with transverse fasteners already described herein above.

In contrast to the McNeny et al handle, Des. U.S. Pat. No. 676,723 by Norwood et al, entitled "Two handled shovel," the teachings which are incorporated by reference herein, illustrates what appears to be a long handle of unitary construction having an ergonomic geometry that addresses ergonomic issues and fatiguing and durability issues of transverse fasteners, but which instead fails to address space limitations for storage and shipping of long handle tools and implements.

While each of these immediately aforementioned second handles are provided with grips very close to the long handle, other artisans have devised implements and tools with two long handles, sometimes where the angle between the two long handles can be varied. Exemplary U.S. patents, the teachings which are incorporated herein by reference, include: U.S. Pat. No. 4,129,327 by Moore, entitled "Shovel"; U.S. Pat. No. 4,787,661 by Rutledge, entitled "Adjustable double handled shovel"; U.S. Pat. No. 5,133, 582 by Rocha, entitled "Two-handed shovel"; U.S. Pat. No. 7,331,620 by Wang, entitled "Shovel capable of facilitating the operation of throwing shoveled objects off"; U.S. Pat. No. 9,163,372 by Elston, entitled "Three handled snow shovel"; and Des U.S. Pat. No. 716,119 by Elston, entitled "Shovel". For some applications, these designs may offer much benefit. However, these multiple long handle constructions also run the risk of sudden and unexpected repositioning and associated injury. In addition, these configurations are not intuitive, and so lack more universal appeal. Finally, these configurations also fail to address the shipping and inventory problems associated with a long handle, and instead make any modifications needed to address shipping and inventory space requirements far more complicated to incorporate.

Other artisans have devised various configurations of multi-sections, multi-handles, and multi-implements. Exemplary U.S. patents, the teachings which are incorporated herein by reference, include: U.S. Pat. No. 5,799,996 by Fredrickson, entitled "Multi-function hand tool," which describes prior art threaded couplings that can rotate under load; U.S. Pat. No. 5,937,627 by McKittrick, entitled "Gardening implement having enhanced leverage," which describes a conventional chuck such as found on a drill to add and remove tool heads; U.S. Pat. No. 6,199,245 by Blessing, entitled "Multi-component lawn and garden handle," which describes a wide variety of couplings that suffer from the limitations of the transverse fasteners such as nails, screws, pins and the like found in the basic tools and implements most commonly commercially sold; U.S. Pat. No. 8,740,272 by Walden et al, entitled "Ergonomically designed multi-handled tool," which describes a variety of tool implements, but fails to teach any new way to affix the tools into position, merely stating that any suitable mechanism can be used; U.S. Pat. No. 9,498,877 by Henry, entitled "Shovel with two integral handles and exterior handle," which describes in-line handles unitary with the long handle; and U.S. Pat. Nos. 9,731,409 and 9,757,851 by Meinzer et al, each entitled "outdoor tool system with interchangeable modular heads," and each which describes a modular tool that suffers from the limitations of the transverse fasteners such as nails, screws, pins and the like found in the basic tools and implements most commonly commercially sold. So while most of these immediately aforementioned multi-section, multi-handle, and multi-implement configurations address shipping constraints well, excepting the unitary construction of Henry, they still suffer from the reliability limitations of the threaded or transverse fasteners commonplace in the prior art.

Some artisans have devised apparatuses that incorporate end-affixed shafts or handles for different and diverse purpose from the present invention. Exemplary U.S. patents, the teachings which are incorporated herein by reference, include: U.S. Pat. No. 4,265,475 by Jarvis, entitled “Snow handling apparatus”; U.S. Pat. No. 4,387,483 by Larabee, entitled “Extracting handle for earth drill augers”; U.S. Pat. No. 4,471,842 by Fox, entitled “Hand tool having blade and two portion handle secured together by threaded bolt”; U.S. Pat. No. 4,549,611 by Mills, entitled “Multi-purpose hand tool”; and U.S. Pat. No. 7,891,902 by Pettey, entitled “Hobby servo shaft adapter”.

Other artisans have devised single handle implements and tools that incorporate a non-rotatable shaft. Exemplary U.S. patents and published applications, the teachings which are incorporated herein by reference, include: U.S. Pat. No. 931,838 by Beehler, entitled “Shovel”; U.S. Pat. No. 1,644,881 by Hokanson, entitled “Shovel”; U.S. Pat. No. 1,776,434 by Hokanson, entitled “Hollow-back shovel”; U.S. Pat. No. 3,024,031 by Davidson, entitled “Tool handle adapter socket”; U.S. Pat. No. 5,943,796 by Hedstrom, entitled “Roof snow removal device”; U.S. Pat. No. 8,002,322 by Rathmell et al, entitled “Multi-use snow tool”; Des U.S. Pat. No. 303,068 by Zabarte, entitled “Axe Mattock”; Des U.S. Pat. No. 427,494 by Yacobi, entitled “Handle shaft for a garden or snow tool”; Des U.S. Pat. No. 514,917 by Coudurier, entitled “Handle”; 2015/0121728 by Spataro et al, entitled “dual mode collapsable shovel”; and 2015/0123413 by Spataro et al, entitled “collapsable shovel handle”.

A large number of additional U.S. tool and implement patents of varying relevance providing more general background content, the relevant teachings and contents which are incorporated herein by reference, include: U.S. Pat. No. 161,678 by Gardner, entitled “Lifting Attachment for shovels and forks”; U.S. Pat. No. 309,437 by Calef, entitled “Spoon”; U.S. Pat. No. 407,571 by Calef, entitled “Knife for cutting corn”; U.S. Pat. No. 479,661 by Poulson, entitled “Spade”; U.S. Pat. No. 712,843 by Paul, entitled “Pneumatic sugar cane cutter”; U.S. Pat. No. 930,660 by Gifford, entitled “Snow Shovel”; U.S. Pat. No. 1,027,345 by Lapin, entitled “Trench digging shovel”; U.S. Pat. No. 1,901,778 by Schlag, entitled “Hoe”; U.S. Pat. No. 2,463,621 by Herzog, entitled “Detachable handle connection”; U.S. Pat. No. 2,536,607 by Jenkins, entitled “Broom rake”; U.S. Pat. No. 3,014,750 by Briggs, entitled “Easy hold shovel handle”; U.S. Pat. No. 3,155,414 by Bales, entitled “Handle”; U.S. Pat. No. 4,128,266 by Vaslas, entitled “Auxiliary handle for long-handled implements”; U.S. Pat. No. 4,155,582 by Reisner, entitled “Handle accessory for work tools”; U.S. Pat. No. 4,264,096 by Barnett, entitled “Two handled freely pivotable scoop”; U.S. Pat. No. 4,280,727 by Germain, entitled “Injection molded snow shovel”; U.S. Pat. No. 4,615,553 by Hultine, entitled “Auxiliary shovel handle”; U.S. Pat. No. 4,704,758 by Hoffman, entitled “Handle construction for long handled implements”; U.S. Pat. No. 4,958,407 by Johnson, entitled “Auxiliary tool handle”; U.S. Pat. No. 5,522,629 by Loo, entitled “Reversible rake and shovel implement”; U.S. Pat. No. 5,533,768 by Mitchell, entitled “Ergonomic shovel”; U.S. Pat. No. 5,771,535 by Blessing, entitled “Lawn and garden handle”; U.S. Pat. No. 6,601,887 by Graves, entitled “Leverage enhancement arrangement for tool”; U.S. Pat. No. 6,830,271 by Piscopo et al, entitled “Two-handled shovel”; U.S. Pat. No. 8,381,358 by Frey, entitled “Universal handle”; U.S. Pat. No. 9,643,311 by Cowie, entitled “Octagonal extension handle”; U.S. Pat. No. 10,161,092 by Lovell, entitled “Rotating and or extending hand driven tool and associated systems and methods”; 2005/0153606 by Lane et al, entitled “Means and apparatus for ergonomic water paddle with dynamic rotating grip”; Des U.S. Pat. No. 401,833 by Whitehead et al, entitled “Handgrip for a child’s snow shovel”; Des U.S. Pat. No. 580,732 by Meagher et al, entitled “Handle assembly”; and Des U.S. Pat. No. 825,295 by Roberts, entitled “Shovel”.

Additional U.S. tool and implement patents of varying relevance providing more general background content, the relevant teachings and contents which are incorporated herein by reference, include: U.S. Pat. No. 378,540 by Brough, entitled “Handle attachment”; U.S. Pat. No. 1,629,041 by Minier, entitled “Yieldable coupling”; U.S. Pat. No. 4,477,114 by Callis, entitled “Adjustable rake head and improved handle support”; U.S. Pat. No. 4,635,429 by Cornelius, entitled “Windrow yard rake”; U.S. Pat. No. 4,644,740 by Lee, entitled “Reversible rake”; U.S. Pat. No. 4,653,142 by Upton, entitled “Extensible tool handle”; U.S. Pat. No. 4,791,780 by Phillips, entitled “Roof rake”; U.S. Pat. No. 4,822,087 by DeCarlo, entitled “Lift improvement device”; U.S. Pat. No. 4,888,846 by Natale, entitled “Asbestos scraper”; U.S. Pat. No. 5,014,792 by Gierloff, entitled “Garden glove tool”; U.S. Pat. No. 5,065,475 by Watt, entitled “Handle attachment for an implement having an elongate handle shaft”; U.S. Pat. No. 5,810,408 by Armstrong, entitled “Ergonomically efficient tool”; U.S. Pat. No. 6,203,626 by Biggs et al., entitled “Ergonomic mop method”; U.S. Pat. No. 6,918,240 by Hurt, entitled “Push rake”; U.S. Pat. No. 7,093,667 by Hurt, entitled “Ergonomic hand tool”; U.S. Pat. No. 7,290,311 by Vosbikian et al., entitled “Implements with handles and working ends and method of use thereof”; U.S. Pat. No. 8,511,209 by Bishop et al., entitled “Ergonomic one- or two-handed tool handle or support”; Des. U.S. Pat. No. 281,393 by Karnhag et al., entitled “Holder for elongated objects”; 2003/0116982 by Nicolay et al., entitled “Tool handle”; 2013/0327191 by Wason, entitled “Handle Assembly For Hand-Operated Tool”; 2015/0098822 by Lee, entitled “Paddle handle”; 2019/0246867 by Ziamandanis, entitled “Double-Handle Apparatus”; 2019/0291262 by Bunker, entitled “Tool handle”; and 2019/0357436 by Hamilton, entitled “Ergonomic grip for weed trimmer”.

Other U.S. patents that illustrate a wide and diverse but non-limiting collection of exemplary hand grips, some which are duplicated herein above for other purposes, and most which may be incorporated as alternative grip structures within the present invention as will become apparent herein below, the teachings which are incorporated herein by reference, include: U.S. Pat. No. 61,784 by Wheat, entitled “Snow-shovel”; U.S. Pat. No. 157,634 by Reagan, entitled “Handles for saws”; U.S. Pat. No. 184,918 by Siddall, entitled “Hand-protectors for broom-handles”; U.S. Pat. No. 239,126 by Wagner, entitled “Tip for broom handles”; U.S. Pat. No. 245,542 by Moran, entitled “Handle for velocipedes”; U.S. Pat. No. 264,527 by Haley, entitled “Rubber handle”; U.S. Pat. No. 264,798 by Tyler, entitled “Rubber covered handle”; U.S. Pat. No. 296,879 by Scollay, entitled “Balance tip for brooms”; U.S. Pat. No. 309,437 by Calef, entitled “Spoon”; U.S. Pat. No. 347,054 by Morse, entitled “Handle for bicycles”; U.S. Pat. No. 407,571 by Calef, entitled “Knife for cutting corn, etc.”; U.S. Pat. No. 479,661 by Poulson, entitled “Spade”; U.S. Pat. No. 581,260 by Biddle, entitled “Hand rest for bicycle handle bars”; U.S. Pat. No. 606,534 by Gifford, entitled “Snow Shovel”; U.S. Pat. No. 615,793 by Bowman, entitled “Hand grip for bicycle handle bars”; U.S. Pat. No. 661,253 by Zimmerman, entitled “Can opening key”; U.S. Pat. No. 693,100 by Bell, entitled “Duster for cleaning walls, etc.”; U.S. Pat. No.

712,843 by Paul, entitled "Pneumatic sugar cane cutter"; U.S. Pat. No. 781,772 by Gifford, entitled "Snow Shovel"; U.S. Pat. No. 930,660 by Gifford, entitled "Snow Shovel"; U.S. Pat. No. 969,528 by Disbrow, entitled "Butter spade"; U.S. Pat. No. 1,200,925 by Delamere et al, entitled "Tooth brush and holder"; U.S. Pat. No. 1,443,596 by Schaefer, entitled "Cushion attachment for handles"; U.S. Pat. No. 1,482,858 by Nigh et al, entitled "Handle-bar grip for motor cycles"; U.S. Pat. No. 1,503,251 by Schoof, entitled "Implement handle"; U.S. Pat. No. 1,529,835 by Hamilton, entitled "Handle construction"; U.S. Pat. No. 1,609,414 by Lenny, entitled "Brush"; U.S. Pat. No. 1,644,881 by Hokanson, entitled "Shovel"; U.S. Pat. No. 1,648,354 by Lied, entitled "Golf club"; U.S. Pat. No. 1,776,434 by Hokanson, entitled "Hollow-back shovel"; U.S. Pat. No. 1,790,466 by Gordon, entitled "Window cleaning device"; U.S. Pat. No. 1,851,426 by Haskell, entitled "Tool handle"; U.S. Pat. No. 1,858,380 by Stoddard, entitled "File handle"; U.S. Pat. No. 1,877,125 by Evans, entitled "Mop handle structure"; U.S. Pat. No. 2,070,768 by Wright, entitled "Mixer"; U.S. Pat. No. 2,116,928 by Hanneman, entitled "Gripping implement"; U.S. Pat. No. 2,279,324 by Julien, entitled "Spade or shovel"; U.S. Pat. No. 2,567,565 by Keeler et al, entitled "Handle"; U.S. Pat. No. 2,699,353 by Nagy et al, entitled "Pistol grip doorknob"; U.S. Pat. No. 2,737,060 by Russell, entitled "Steering devices"; U.S. Pat. No. 2,951,482 by Sullivan, entitled "Surgical saw"; U.S. Pat. No. 3,014,750 by Briggs, entitled "Easy hold shovel handle"; U.S. Pat. No. 3,024,031 by Davidson, entitled "Tool handle adapter socket"; U.S. Pat. No. 3,155,414 by Bales, entitled "Handle"; U.S. Pat. No. 3,222,699 by Zeisig, entitled "Snow shovel with handle mounted ice chopper"; U.S. Pat. No. 3,226,149 by McJohnson, entitled "Spade, shovel and spading fork"; U.S. Pat. No. 3,268,968 by Crickmer, entitled "Slip handle"; U.S. Pat. No. 3,372,509 by Arsenault, entitled "Fishing rod handling device"; U.S. Pat. No. 3,372,510 by Arsenault, entitled "Fishing rod handling device"; U.S. Pat. No. 3,549,189 by Alosi, entitled "Tool handle"; U.S. Pat. No. 3,751,804 by Pulrang, entitled "Deburring tool"; U.S. Pat. No. 3,949,817 by Rice, entitled "Chain saw extender"; U.S. Pat. No. 4,128,266 by Vaslas, entitled "Auxiliary handle for long-handled implements"; U.S. Pat. No. 4,129,327 by Moore, entitled "Shovel"; U.S. Pat. No. 4,147,348 by Lee, entitled "Tennis racket providing increased hitting power"; U.S. Pat. No. 4,155,582 by Reisner, entitled "Handle accessory for work tools"; U.S. Pat. No. 4,155,582 by Reisner, entitled "Handle accessory for work tools"; U.S. Pat. No. 4,197,764 by Auernhammer, entitled "Detachable handle assembly"; U.S. Pat. No. 4,263,690 by Dobosi, entitled "Paint roller tool with hand grip"; U.S. Pat. No. 4,378,718 by Kraft et al, entitled "Handle for pivotable machine parts"; U.S. Pat. No. 4,495,669 by Hooper, entitled "Dual-grip handle brush for painting and the like"; U.S. Pat. No. 4,537,433 by Yang, entitled "Auxiliary handle for a shovel"; U.S. Pat. No. 4,548,092 by Strong, Jr, entitled "Bicycle gear shift unit"; U.S. Pat. No. 4,690,447 by Adams, entitled "Raised grip shovel"; U.S. Pat. No. 4,730,632 by Mace, entitled "Cane with handle featuring gripping aids"; U.S. Pat. No. 4,930,181 by Johnson, entitled "Auxiliary tool handle"; U.S. Pat. No. 4,951,956 by Vittone, entitled "Hand grip for a wheelbarrow"; U.S. Pat. No. 4,958,407 by Johnson, entitled "Auxiliary tool handle"; U.S. Pat. No. 5,133,101 by Hauser et al, entitled "Handle for a mop"; U.S. Pat. No. 5,133,582 by Rocha, entitled "Two-handed shovel"; U.S. Pat. No. 5,145,210 by Lennon, entitled "Bicycle, handlebar and adapter system"; U.S. Pat. No. 5,451,085 by Wagner, entitled "Tool handle holder"; U.S. Pat. No. 5,496,085 by Middleton, entitled "Auxiliary handle unit for long handled hand tools"; U.S. Pat. No. 5,529,357 by Hoffman, entitled "Leverage enhancing assembly"; U.S. Pat. No. 5,544,935 by Cone et al, entitled "Carrier apparatus"; U.S. Pat. No. 5,581,915 by Lobato, entitled "Snowplow carriage assembly for manual snow removal"; U.S. Pat. No. 5,595,532 by McCracken, entitled "Electrically-powered polisher"; U.S. Pat. No. 5,606,772 by Ilic, entitled "Ergonomic handle grip for tools"; U.S. Pat. No. 5,651,581 by Myers et al, entitled "Infant seat handle"; U.S. Pat. No. 5,695,231 by Hoffman, entitled "Leverage enhancing grip assembly"; U.S. Pat. No. 5,771,535 by Blessing, entitled "Lawn and garden handle"; U.S. Pat. No. 5,787,588 by Tisbo et al, entitled "Ice chipper"; U.S. Pat. No. 5,799,996 by Fredrickson, entitled "Multi-function hand tool"; U.S. Pat. No. 5,802,960 by Graj et al, entitled "Ergonomic cookware"; U.S. Pat. No. 5,813,206 by McKittrick, entitled "Garden tool having enhanced leverage"; U.S. Pat. No. 5,830,047 by McCracken, entitled "Electrically-powered polisher"; U.S. Pat. No. 5,926,895 by Roy, entitled "Vacuum cleaner hose cleaning brush"; U.S. Pat. No. 5,937,627 by McKittrick, entitled "Gardening implement having enhanced leverage"; U.S. Pat. No. 5,979,005 by Lecce, entitled "Toothbrush apparatus"; U.S. Pat. No. 6,101,657 by Hamilton, entitled "Applicator having an extension"; U.S. Pat. No. 6,101,909 by Djie, entitled "Rotary tool"; U.S. Pat. No. 6,122,792 by Roy, entitled "Tube and hose cleaning brush"; U.S. Pat. No. 6,168,507 by McCracken, entitled "Electrically-powered polisher"; U.S. Pat. No. 6,199,245 by Blessing, entitled "Multi-component lawn and garden handle"; U.S. Pat. No. 6,203,081 by Kegan, entitled "Easy lift levered shovel"; U.S. Pat. No. 6,343,822 by Badura, entitled "Pivoting shovel handle"; U.S. Pat. No. 6,434,793 by Ensson, entitled "Device arranged at the end of a handle"; U.S. Pat. No. 6,460,911 by Engelsiepen, entitled "Ditch scooping device"; U.S. Pat. No. 6,564,426 by Wang, entitled "Retractable handle assembly having rotatable hand grip"; U.S. Pat. No. 6,725,491 by Hung, entitled "Car waxing machine with driving handle"; U.S. Pat. No. 6,798,348 by Wilker et al, entitled "Ergonomically designed tool handle"; U.S. Pat. No. 6,814,156 by Dieterle et al, entitled "Hand guided electrical tool with an auxiliary handle"; U.S. Pat. No. 6,871,377 by Veltrop et al, entitled "Grill scraper"; U.S. Pat. No. 7,032,942 by Stuart, entitled "Extensible grip stand-up shovel"; U.S. Pat. No. 7,350,839 by Marquardt et al, entitled "Hand tool"; U.S. Pat. No. 7,396,187 by Meyers, entitled "Upright trowel"; U.S. Pat. No. 7,398,579 by Moshenrose, entitled "Ergonomic appliance handle"; U.S. Pat. No. 7,637,882 by Carman et al, entitled "Multiple use handle support for distributing forces"; U.S. Pat. No. 7,836,557 by Baker, entitled "Ergonomic garden trowel"; U.S. Pat. No. 8,006,351 by Baker, entitled "Short-handled, ergonomic garden tools"; U.S. Pat. No. 8,065,774 by Schiesz et al, entitled "Paint brush with detachable head"; U.S. Pat. No. 8,108,966 by Viviano, entitled "Vacuum acoustic ceiling removal system"; U.S. Pat. No. 8,152,396 by Kuykendall, entitled "Function first grip"; U.S. Pat. No. 8,381,358 by Frey, entitled "Universal handle"; U.S. Pat. No. 8,387,263 by Roberts, entitled "Easy use utensil"; U.S. Pat. No. 8,640,295 by Schiesz et al, entitled "Paint brush with detachable head"; U.S. Pat. No. 8,683,896 by Gerbec et al, entitled "Ergonomic surgical instrument handle"; U.S. Pat. No. 8,714,607 by Suber, entitled "Hand shovel assembly"; U.S. Pat. No. 8,740,272 by Walden et al, entitled "Ergonomically designed multi-handled tool"; U.S. Pat. No. 8,740,272 by Walden et al, entitled "Ergonomically designed multi-handled tool"; U.S. Pat. No. 8,776,648 by Lee, entitled "Ergonomic tool handle enhancement"; U.S.

Pat. No. 8,832,898 by Stimach, entitled "Two-handed scraping device"; U.S. Pat. No. 9,163,372 by Elston, entitled "Three handled snow shovel"; U.S. Pat. No. 9,498,877 by Henry, entitled "Shovel with two integral handles and exterior handle"; U.S. Pat. No. 9,889,550 by McNeny et al, entitled "Step down handle for a hand tool"; Des U.S. Pat. No. 170,892 by Schoenwald, entitled "Combined holder and handle for electric soldering irons and the like"; Des U.S. Pat. No. 215,081 by Zagwyn, entitled "Golf cart handle grip"; Des U.S. Pat. No. 240,678 by Herig, entitled "Handle for paint rollers and brushes"; Des U.S. Pat. No. 251,566 by Moen, entitled "Adjustable handle"; Des U.S. Pat. No. 300,713 by Trapasso, entitled "Arm-attached tree climbing tool"; Des U.S. Pat. No. 31,050 by De Witt, entitled "Grip for handle bars"; Des U.S. Pat. No. 334,525 by Adams, entitled "Handle for a fireplace tool"; Des U.S. Pat. No. 339,731 by Stewart, entitled "Tool handle"; Des U.S. Pat. No. 339,732 by Stewart, entitled "Tool handle"; Des U.S. Pat. No. 360,123 by Shu, entitled "Handle for a tool"; Des U.S. Pat. No. 373,944 by Thompson et al, entitled "Screwdriver handle"; Des U.S. Pat. No. 377,300 by Fredrick von Essen, entitled "Two-handled shovel"; Des U.S. Pat. No. 387,263 by Bidstrup et al, entitled "Tool handle"; Des U.S. Pat. No. 388,684 by Irwin, entitled "Hand grip"; Des U.S. Pat. No. 396,624 by Basilius, entitled "Handle grip"; Des U.S. Pat. No. 401,833 by Whitehead et al, entitled "Handgrip for a child's snow shovel"; Des U.S. Pat. No. 418,734 by Ritrovato et al, entitled "Pair of handle grips"; Des U.S. Pat. No. 432,891 by Sterling, entitled "Tool handle"; Des U.S. Pat. No. 459,642 by Haquin, entitled "Scissors handle rings"; Des U.S. Pat. No. 466,389 by Clivio, entitled "Handle for a garden tool"; Des U.S. Pat. No. 468,618 by Ho, entitled "Handle of a hand tool"; Des U.S. Pat. No. 487,010 by Marquardt et al, entitled "Handle for a hand tool"; Des U.S. Pat. No. 493,685 by Dallas, entitled "Tool handle"; Des U.S. Pat. No. 528,398 by Meyer et al, entitled "Edger handle"; Des U.S. Pat. No. 544,330 by Hurley, entitled "Three lobed handle for tools"; Des U.S. Pat. No. 611,321 by Boies et al, entitled "Circular grip"; Des U.S. Pat. No. 627,619 by Demers et al, entitled "Tool handle"; Des U.S. Pat. No. 668,128 by Masalin et al, entitled "Handle for cutting tool"; Des U.S. Pat. No. 676,723 by Norwood et al, entitled "Two handled shovel"; Des U.S. Pat. No. 686,477 by Pookrum, entitled "Scissor handles"; Des U.S. Pat. No. 690,183 by Lee, entitled "Ergonomic tool handle"; Des U.S. Pat. No. 697,783 by Chesner, entitled "Ergonomic handgrip"; Des U.S. Pat. No. 706,594 by Workman et al, entitled "Shovel handle"; and Des U.S. Pat. No. 716,119 by Elston, entitled "Shovel".

To more readily ship and store a shovel, rake, or other hand tool or implement, the handle must be shortened. As discussed herein above, a segmented handle takes care of the shipping problem and may provide improved ergonomics, but prior solutions result in a more flimsy and less reliable tool. As may be apparent, in spite of the enormous advancements over many years, and the substantial research and development that has been conducted by highly skilled artisans, there still remains a need for a hand tool or implement handle that is simultaneously very ergonomic, durable, reliable, and which requires minimal space to ship and store.

In commonly owned U.S. Pat. No. 11,780,073 by Hurt, entitled Handle With Offset Connector", the teachings and contents which are incorporated herein by reference in entirety, an offset connector is disclosed that subdivides a long, slender tool or implement handle. The offset connector is inserted intermediate between a primary handle grip and the tool or implement head, thereby subdividing the long slender tool or implement handle into at least two separate handle segments while also providing improved ergonomic benefit. While the offset connector illustrated therein offers much advantage and benefit over the prior art referenced herein above, the present invention seeks to improve upon some of the various handle and tool connectors used therein.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a hand tool comprising: a longitudinally extensive handle; a first coupler half selectively secured to and terminating the handle; a second coupler half selectively removable from the first coupler half and having a mounting stop, a threaded tube, a central axis of the threaded tube that defines a second coupler half longitudinal axis, and an anti-rotation member displaced radially from the second coupler half longitudinal axis. An implement affixing knob has a knob body, an outer surface configured to be manually grasped and rotated, and a threaded bore configured to selectively thread on to the second coupler half threaded tube.

OBJECTS OF THE INVENTION

Exemplary embodiments of the present invention solve inadequacies of the prior art and provide a more ergonomic handle for implement heads and handle assemblies relative to agricultural, garden, snow, maintenance and other common household and professional tools. Cylindrical handle segments are end mounted into an intermediate offset connector body, with each segment parallel but transversely and longitudinally offset from the other so that the handles are adjacent and overlapping for at least a short distance. A fastener extends through the offset connector body into a cylindrical wedge located in the interior of the cylindrical handle segments, with the fastener longitudinal axis running parallel to the handle segment longitudinal axis. The fastener shortens the wedge in the direction of the fastener longitudinal axis, while driving the wedge radially outward therefrom to secure to the handle segment. Benefits from these changes include the ability to pack the handle, offset connector body, secondary and tertiary handles if so provided, and implement parts in a single compact box that is shipped using conventional shippers such as the United States Post Office, Fed-Ex, or UPS without the significant extra fees required for oversize boxes. A first coupler half that is defined in the preferred embodiment by internal ramped cylindrical compression wedge terminates the handle. A second coupler half engages to the first. The second coupler half includes: a coupling face, for exemplary and non-limiting purpose such as a plate that extends in a plane transverse to the handle longitudinal axis; and a threaded post protruding perpendicular or normal to the plate. A tool implement head has a coupling face, for exemplary and non-limiting purpose such as a mounting plate that is placed adjacent the second coupler half plate, with the threaded post passing through the tool implement head post. A jam nut manually threads onto the threaded post, and applies force to squeeze the tool implement head planar face between the jam nut and first coupler half plate.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a tool or implement handle that is simultaneously very ergonomic, durable, reliable, cost-effective, and which requires minimal space to ship and store. A second object of the invention is to provide a non-rotational tool and implement handle that is easily subdivided for compact shipping and storage. Another object of the present invention is to provide a non-rotational tool and implement handle that is easily and intuitively manually assembled by an end user, and which enables the end user to customize a variety of features, for exemplary and non-limiting purpose including: the type of implement head; the length of each handle segment, and the types and orientation of handle grips. A further object of the invention is to allow a person to intuitively adjust or replace the tool or implement handle during or between use, to accommodate instantaneous needs or requirements. Yet another object of the present invention is to provide a tool or implement handle that fulfills the aforementioned objectives while facilitating A/B two part mold formation of an implement or tool handle offset connector.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
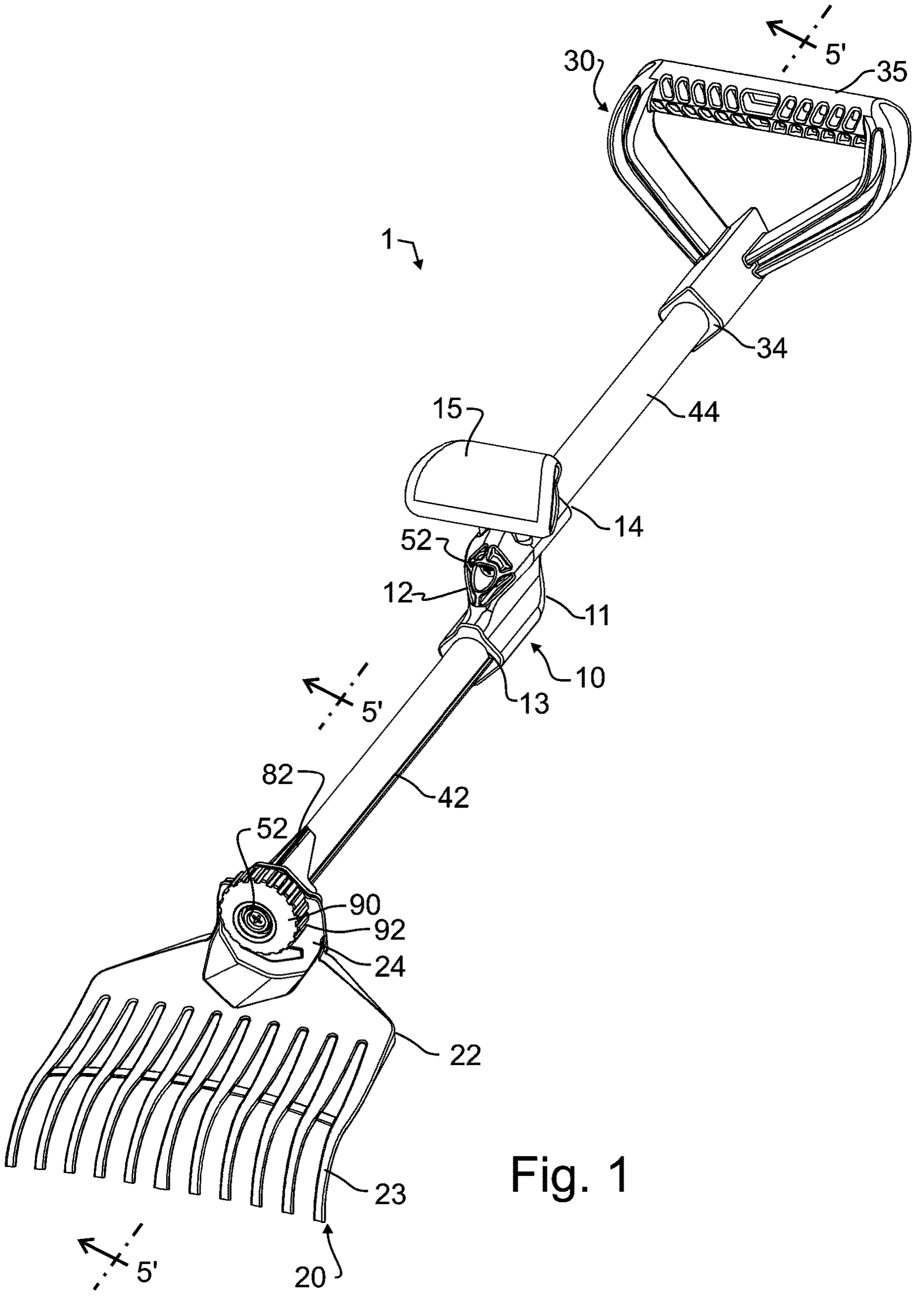
FIGS. 1 through 4 illustrate a preferred embodiment hand tool with external jam nut and internal ramped cylindrical compression wedge designed in accord with the teachings of the present invention from an isometric, side elevational, back elevational, and front elevational views, respectively.
Figure 2:
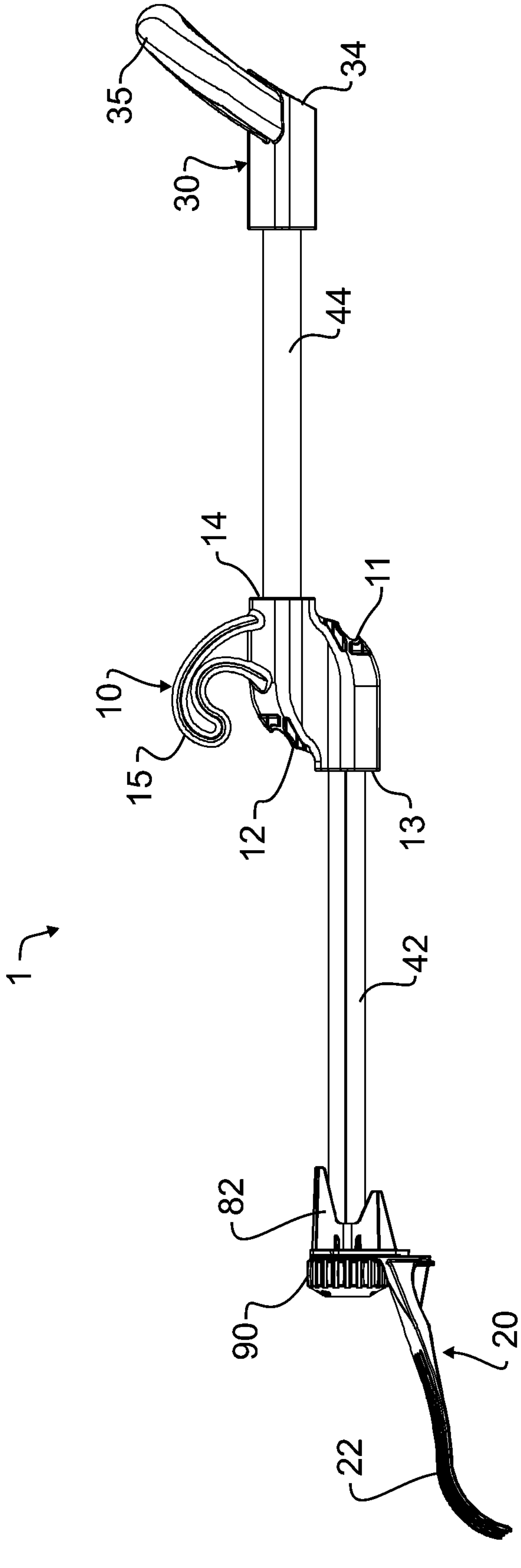
Figure 3:
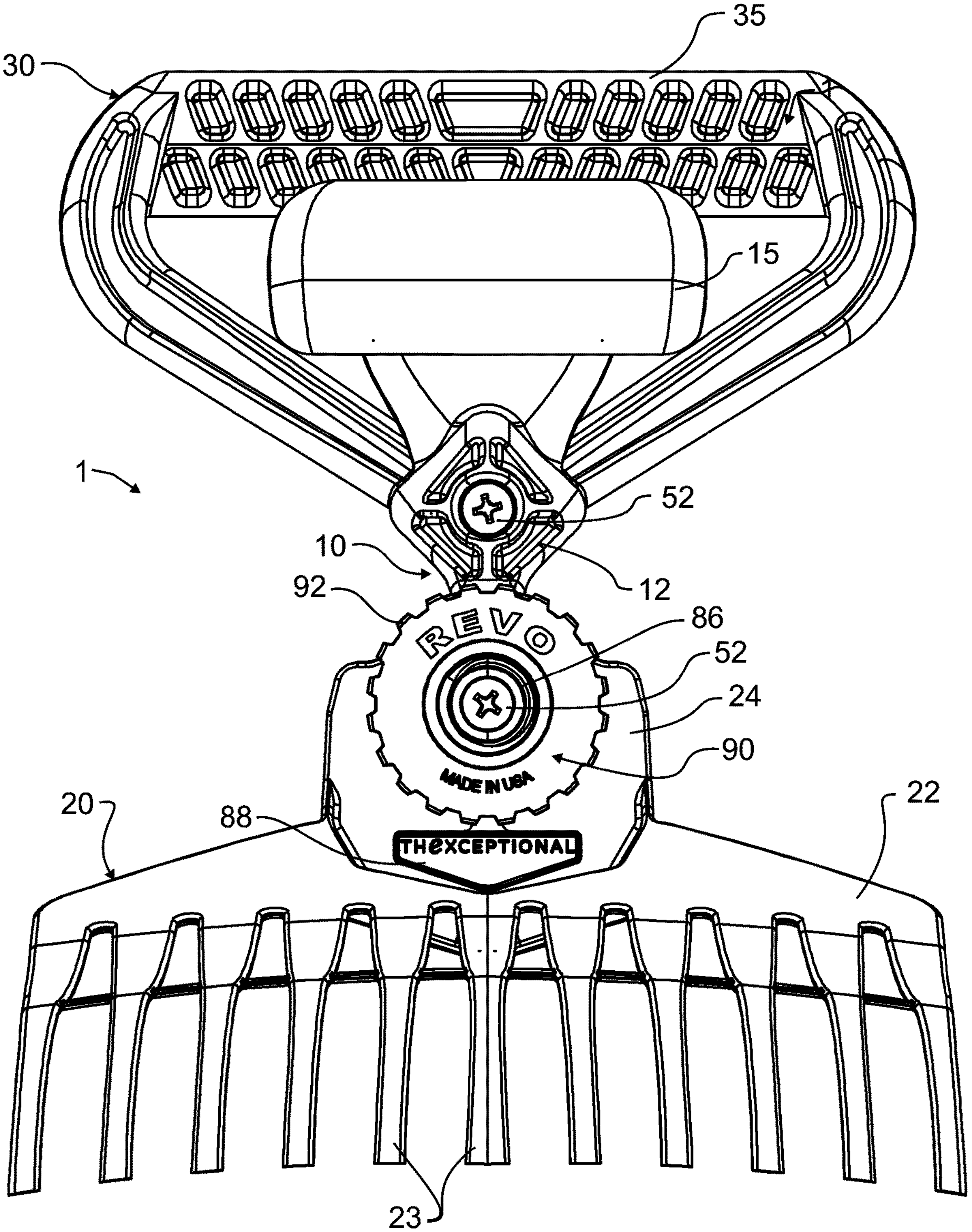
Figure 4:
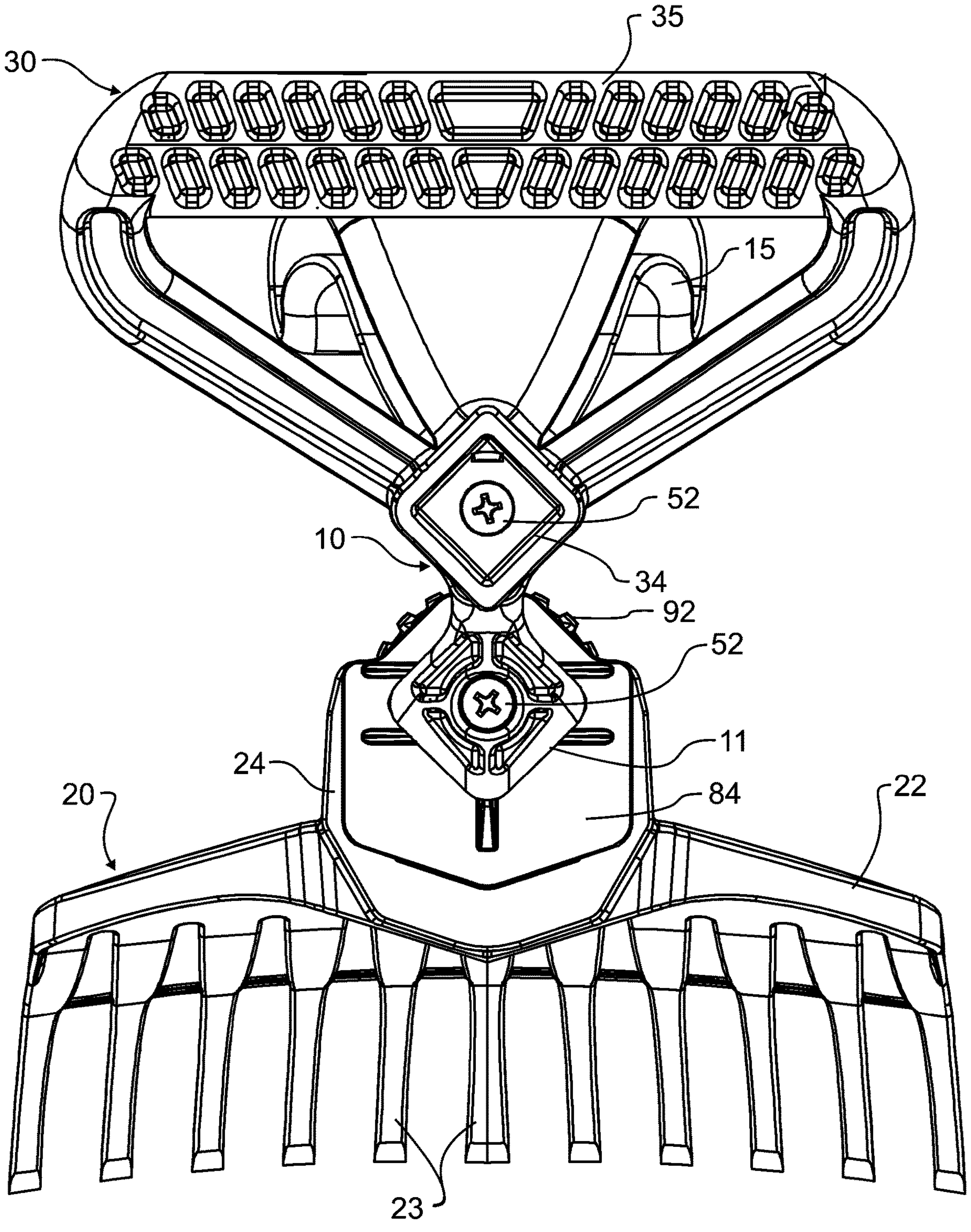

Manifested in the preferred embodiment, the present invention provides a hand tool with external jam nut and internal ramped cylindrical compression wedge. As illustrated in FIGS. 1-4, a hand tool 1 comprises an offset connector 10, implement head 20, terminal handle 30, cylindrical handle segments 42, 44, and a plurality of internal ramped cylindrical compression wedges 50. The plurality of internal ramped cylindrical compression wedges 50 selectively affix each of the offset connector 10, implement head 20, terminal handle 30, and cylindrical handle segments 42, 44 into the configuration illustrated in FIGS. 1-4. This fully assembled and functional configuration illustrated in FIGS. 1-4 is the configuration that an end user would desire to apply the implement head to perform work on a body, object, surface, or to perform any another intended activity or function that the implement head is designed and configured for. When instead preferred embodiment hand tool 1 is in a shipping and storage configuration, one and optionally each of offset connector 10, implement head 20, terminal handle 30, and cylindrical handle segments 42, 44 will be separated from the others. Separating the offset connector 10, implement head 20, terminal handle 30, and cylindrical handle segments 42, 44 from each other allows these components to be packed immediately adjacent to each other and allows implement head 20 and terminal handle 30 to be reoriented to a very efficient packaging orientation.

As illustrated in FIGS. 1-5, offset connector 10 comprises two longitudinally parallel, laterally offset, and partially longitudinally overlapping cylindrical handle segment receiver sockets 13 and 14. Two slightly recessed opposed end plate screw openings 11 and 12 pass into the cylindrical handle segment receiver sockets 13 and 14, respectively.

Offset connector 10 is inserted intermediate between implement head 20 and terminal handle 30, thereby subdividing the elongate slender preferred embodiment hand tool 1 into at least two separate cylindrical handle segments, the geometry which is determined by the dimensions of cylindrical handle segments 42, 44. Offset connector 10 is configured to receive cylindrical handle segments 42, 44. In the fully assembled and functional configuration illustrated in FIGS. 1-4, these cylindrical handle segments 42, 44 are inserted into cylindrical handle segment sockets such as 13 and 14 provided in offset connector 10, and each one of cylindrical handle segments 42, 44 is secured therein by an associated internal ramped cylindrical compression wedge 50 that is longitudinally coaxial with the longitudinal axis of the cylindrical handle segment. Likewise, the distal ends of cylindrical handle segments 42, 44 are inserted into implement head 20 and terminal handle 30, respectively, and secured therein by an associated internal ramped cylindrical compression wedge 50 that is longitudinally coaxial with the longitudinal axis of the cylindrical handle segment.

As taught and described in commonly owned U.S. Pat. No. 11,780,073, the teachings and contents which were incorporated herein above by reference, in some embodiments different secondary and tertiary grips are attached to and removed from offset connector 10. As illustrated in FIGS. 1-5, a secondary grip 15 is illustrated. The geometry and placement of secondary and tertiary handles or grips, for exemplary and non-limiting purpose such as D-grips and ball grips, will be selected by a particular designer to suit desired objectives and appearance.

To facilitate ready attachment and removal of various implements, an implement coupler 80 and implement affixing knob 90 are configured to affix to cylindrical handle segment 42. This coupling is illustrated in greater detail in the exploded view of FIG. 11 and the vertical plane section view of FIG. 12, and is described in much greater detail herein below. Nevertheless, implement affixing knob 90 can be readily manually unscrewed by a person, allowing the person to quickly and easily change the implement affixed to preferred embodiment hand tool 1.

Terminal handle 30 is coupled to cylindrical handle segment 44 at the end thereof distal to offset connector 10, secured in place by an internal ramped cylindrical compression wedge 50. As illustrated, terminal handle 30 is provided with an ergonomic hand grip 35. Nevertheless, it will be understood that in alternative embodiments terminal handle 30 will be of on any suitable geometry. The geometry of terminal handle 30, for exemplary and non-limiting purpose such as a D-grip, T-handle, or ball grip, will be selected from the myriad of handles known in the prior art by a particular designer to suit desired objectives and appearance.

Cylindrical handle segments 42, 44 each most preferably comprise a tube of any suitable length such as already discussed herein above. These cylindrical handle segments 42, 44, for exemplary and non-limiting purpose, may be made of a lightweight metal tube such as an aluminum or steel tube, or a plastic tube with or without fiber reinforcement. In some embodiments, the tube is factory extruded and cut to some predetermined length suitable for packaging in the shipping and storage configuration also described herein above.

While cylindrical handle segments 42, 44 are depicted as having equal lengths, they may alternatively be cut to different lengths allowing for different ergonomics. When cylindrical handle segments 42, 44 have a consistent cross section throughout their length, in some embodiments they can be cut readily by an end user to any desired cylindrical handle segment length prior to or during assembly.

Additionally, while only one offset connector 10 is illustrated in each of FIGS. 1-5, it will be understood that in some alternative embodiments more than one of the preferred embodiment offset connector 10 will be incorporated into a single hand tool 1. In some alternative embodiments this will allow a designer or user to select a desired ergonomic geometry. Using this same approach of using more than one offset connector 10, the overall length of the packaging may be reduced by using more than two cylindrical handle segments 42, 44, while after assembly the hand tool 1 may extend to the same or even a longer overall length.

In preferred embodiment hand tool 1 as illustrated in FIGS. 1-5, cylindrical handle segments 42, 44 are hollow throughout their length. Nevertheless, in some alternative embodiments cylindrical handle segments 42, 44 are provided with an internal reinforcing web of any suitable geometry. In yet other alternative embodiments cylindrical handle segments 42, 44 have a foam core or are solid. Whether provided with an internal reinforcing web or having a foam or solid core, in such alternative embodiments a small portion of cylindrical handle segments 42, 44 adjacent to the distal ends are either cored out or otherwise formed to be hollow. This provides the internal void necessary for insertion of an internal ramped cylindrical compression wedge 50 therein.

Figure 6:
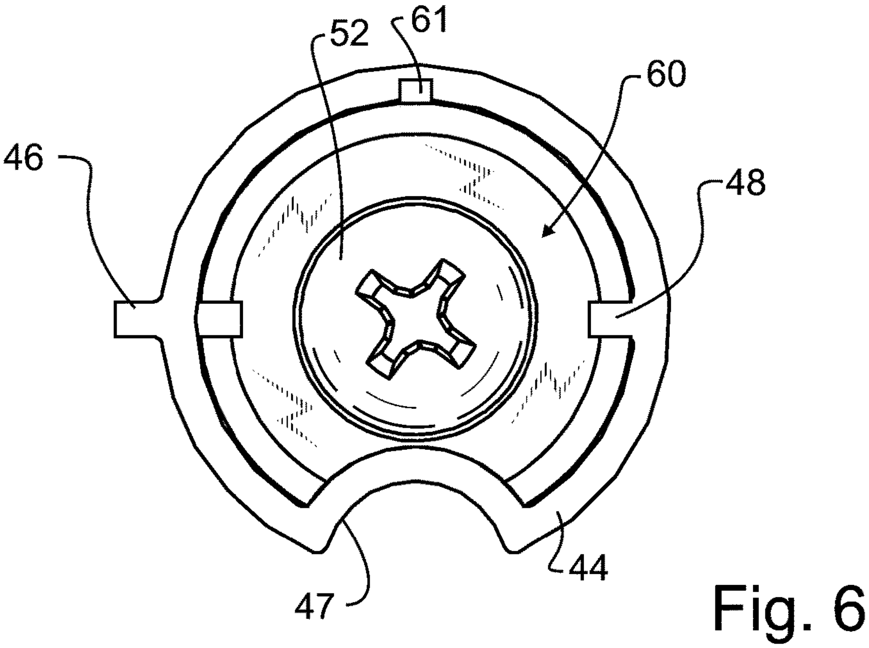
FIG. 6 illustrates a preferred embodiment cylindrical wedge used within the preferred embodiment hand tool with external jam nut and internal ramped cylindrical compression wedge of FIGS. 1-4 by exploded view.

Most preferably, the geometry of handle segments 42, 44 is that of a cylinder having a round cross-section. This provides the greatest strength-to-weight ratio, and is convenient and comfortable for most people. However, this cylindrical geometry does not inherently provide any means to prevent implement head 20 from rotating about the longitudinal axis of cylindrical handle segment 42, nor to prevent rotation at any of the other ends of cylindrical handle segments 42, 44. For some embodiments and particular implements, the static coefficient of friction between the secured-together components is sufficient. However, in alternative embodiments other components may alternatively or in addition prevent such rotation. For exemplary and non-limiting purpose, as illustrated in FIG. 6 in some alternative embodiments one or both of cylindrical handle segments 42, 44 are provided with one or both of at least one protruding rib 46 and at least one intruding rib 48. Protruding rib 46 is configured to engage into a mating slot in an associated receiver socket 13, 14, 34, 82. In addition or alternatively thereto, in some embodiment at least one mating slot 47 is provided into which a protruding rib will extend from an associated receiver socket 13, 14, 34, 82. Note that the provision of a mating slot 47 of geometry as or similar to that illustrated will not only prevent rotation between a cylindrical handle segment 42, 44 relative to an associated receiver socket 13, 14, 34, 82, but also relative to an internal ramped cylindrical compression wedge 50 that must also be designed to accommodate mating slot 47. In other embodiments, intruding rib 48 is configured to engage into a mating slot in longitudinally stationary wedge 60, while protruding rib 61 protrudes from longitudinally stationary wedge 60 into a mating slot in cylindrical handle segments 42, 44.

In yet other alternative embodiments, a slot may be provided in both facing components, and a key 61 may be inserted therein. As is known in power transmission shafts, such keyways and keys can be designed to limit maximum torque between the two objects to prevent damage caused by excessive force application. When such excessive force is applied, key 61 is desirably designed to shear and prevent any further damage from occurring.

Figure 7:
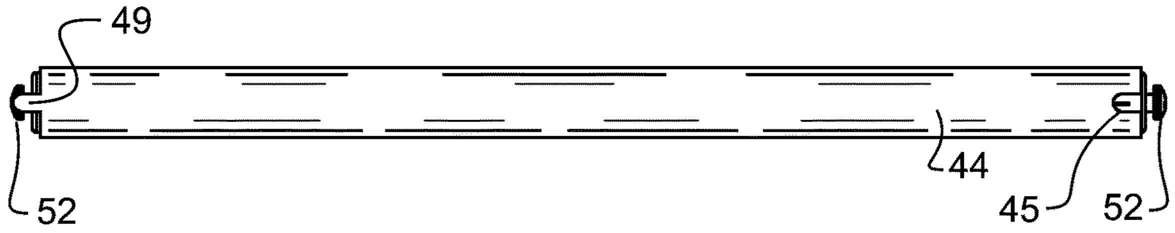
FIG. 7 illustrates various alternative anti-rotational features in a cylindrical handle segment from a front elevational view.

FIG. 7 illustrates another anti-rotation feature, which will be used instead of the aforementioned anti-rotation features in some embodiments and in addition to the aforementioned anti-rotation features in other embodiments. As illustrated, an intruding longitudinal notch 45 is provided at a first longitudinal end of cylindrical handle segment 44, while a protruding longitudinal tongue 49 is provided distally thereto at the second longitudinal end. Notch 45 and tongue 49 are designed to secure with a mating tongue and notch, respectively, in the adjacent components.

Figure 5:
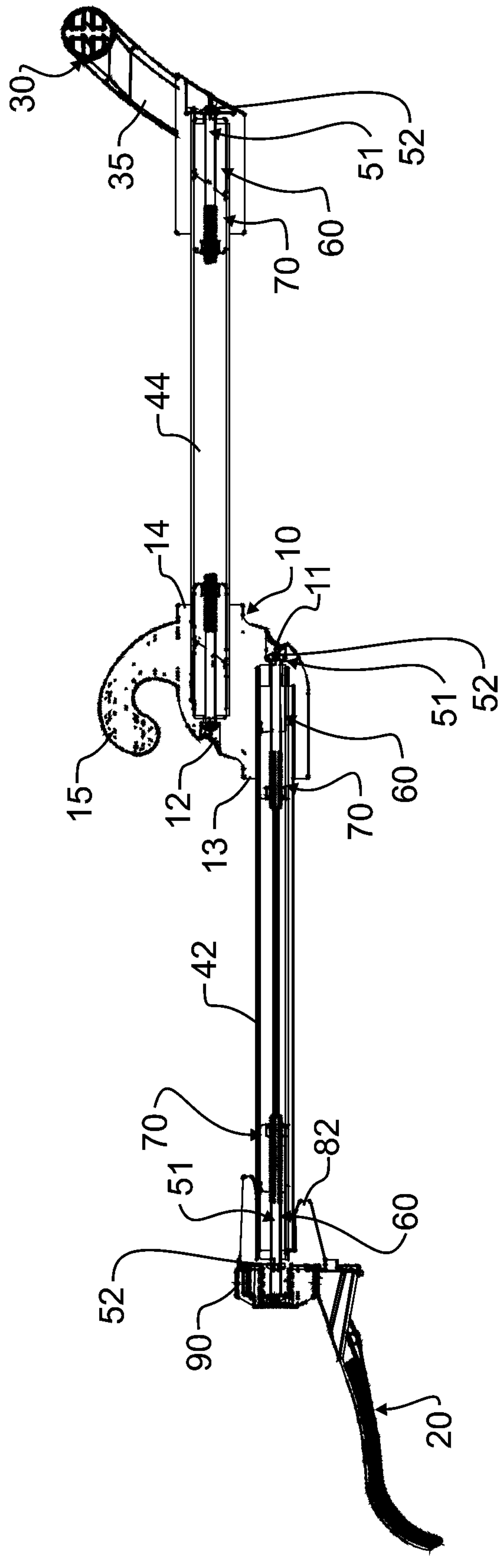
FIG. 5 illustrates the preferred embodiment hand tool with external jam nut and internal ramped cylindrical compression wedge of FIGS. 1-4 from a vertical central plane sectional view taken along section line 5' of FIG. 1.
Figure 8:
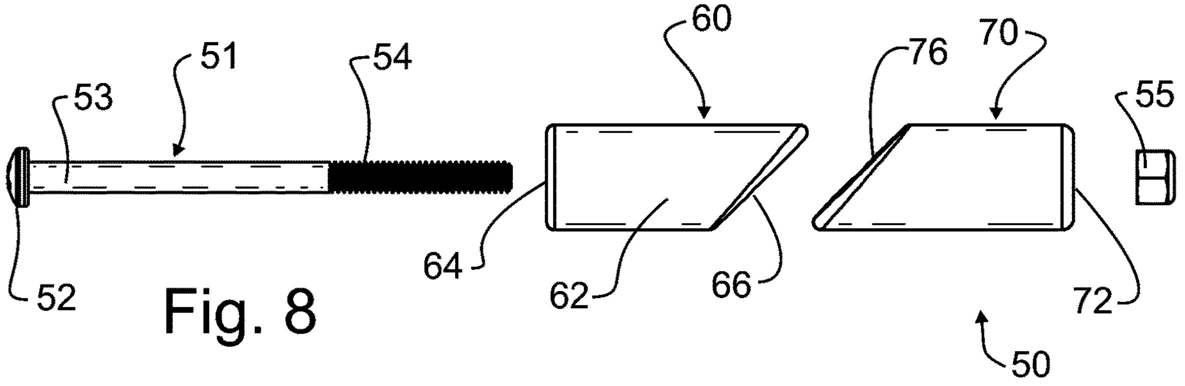
FIG. 8 illustrates a preferred embodiment internal ramped cylindrical compression wedge from a side elevational view.

The internal ramped cylindrical compression wedge 50 illustrated by exploded view in FIG. 8 is shown at approximately the same orientation as the internal ramped cylindrical compression wedges 50 illustrated by vertical plane cross-sectional view in FIG. 5 that affixes offset connector 10 to cylindrical handle segment 44. Internal ramped cylindrical compression wedge 50 comprises a fastener 51, a longitudinally stationary wedge 60, and a longitudinally reciprocating wedge 70. Fastener 51 passes through a hollow central bore 64 in body 62 and a hollow central bore 74 in body 72, and terminates within the central bore of threaded nut 55. Fastener 51 is configured to move longitudinally reciprocating wedge 70 in a reciprocal manner parallel to the longitudinal axis of cylindrical handle segments 42, 44, which is substantially parallel to each of the longitudinal axis of fastener 51 and the longitudinal axis of the longitudinal axis of internal ramped cylindrical compression wedge 50. When ramp 66 and ramp 76 are in contact with each other, and fastener 51 is in some way actuated to drive longitudinally reciprocating wedge 70 more tightly against longitudinally stationary wedge 60, the orientation of ramps 66, 76 relative to each other will cause the ramp end of each of the wedges to be driven outward transversely to the longitudinal axis of cylindrical handle segments 42, 44. The ramp end of wedge 60 is driven in one transverse direction and the ramp end of wedge 70 is driven in a second transverse direction opposite wedge 60. This splaying occurs at the same time as the overall length of internal ramped cylindrical compression wedge 50 shortens. As may be appreciated, at some point any further movement of wedges 60, 70 in a transverse direction will be limited by the inside walls of cylindrical handle segments 42, 44. This means that further actuation of fastener 51 will cause each of wedges 60, 70 to more forcefully lodge against the inside walls of cylindrical handle segments 42, 44, at some point preferably becoming so securely lodged therein as to prevent any relative motion therebetween during normal operation and use of preferred embodiment hand tool 1.

Fastener 51 has a driver head 52 of any suitable geometry to permit a person to rotate fastener 51 about the fastener longitudinal axis. A common phillips screwdriver head is illustrated that enables a person to rotate fastener 51 using a phillips screwdriver. When so rotated, threads 54 will turn into a mating threaded nut 55, drawing threaded nut 55 closer to driver head 52 and thereby compressing longitudinally reciprocating wedge 70 more tightly against longitudinally stationary wedge 60. An unthreaded shank 53 is provided that avoids any unwanted abrasive contact between threads 54 and hollow bore 64 in longitudinally stationary wedge 60. While a common phillips screwdriver head is illustrated for exemplary and non-limiting purpose, in alternative embodiments a hex head, threaded jam nut head, winged head, and others of the myriad of known manual or driver fastener head attachments are provided. In addition, in some embodiments other common fastener components including but not limited to washers of any suitable type will be provided.

As illustrated and described, internal ramped cylindrical compression wedge 50 provides user selected removable affixing and attachment of components, allowing for the attachment and subsequent removal and replacement of a broad spectrum of hand grips, handle assemblies, implement or tool heads, and different widths and heights of such components. While a phillips head bolt is illustrated for fastener 51, it will be understood that other fasteners and fastener heads known in the mechanical arts will be substituted in alternative embodiments.

Ramps 66, 76 as illustrated are smooth. However, in some alternative embodiments these ramps 66, 76 are provided with a higher coefficient of friction. In some of these alternative embodiments additional surface texture or special coatings are provided, and in others of these alternative embodiments each of the ramps 66, 76 are provided with jagged teeth or like protrusions and indentations that interlock between the ramps. In yet further alternative embodiments, secondary internal parts are configured to compress or expand to increase coupling strength, for exemplary and non-limiting purpose such as the provision of a metal washer tip that is affixed to the portion of wedge bodies 62, 72 and configured to bite into the interior surface of cylindrical handle segments 42, 44.

As illustrated, wedge bodies 62, 72 float generally freely within cylindrical handle segments 42, 44 prior to the tightening of fastener 51 and associated splaying of internal ramped cylindrical compression wedge 50, only constrained by the relatively larger diameter hollow bores 64, 74 that circumscribe the relatively smaller outside diameter fastener 51 and by the inside walls of cylindrical handle segments 42, 44. However, in some alternative embodiments, longitudinally stationary wedge 60 may be formed unitarily with or otherwise permanently affixed or secured to an associated part of preferred embodiment hand tool 1. For exemplary and non-limiting purpose, in some alternative embodiments longitudinally stationary wedge 60 is formed unitarily with and at the same time as offset connector 10 is formed. In such embodiments, the inclusion of longitudinally stationary wedge 60 into offset connector 10 is compatible with the two part A/B molding processes described herein below. Such unitary production is also possible by integrating longitudinally stationary wedge 60 into an implement head 20 and into a terminal handle 30.

To ease assembly of preferred embodiment hand tool 1, in some alternative embodiments wedge bodies 62, 72 are slightly tapered. In such alternative embodiments, the outer walls of wedge bodies 62, 72 define a smaller cross-sectional perimeter with increasing distance from driver head 52.

As illustrated, internal ramped cylindrical compression wedge 50 comprises two bodies 62, 72, each having a respective ramp 66, 76. However, in some alternative embodiments, more than two bodies and associated respective ramps are provided.

As may be appreciated, preferred embodiment offset connector 10 can be made of many materials, but is in some embodiments fabricated from a thermoplastic capable of being injection molded. In such embodiments various additives may be incorporated, for exemplary and non-limiting purpose including: ultraviolet inhibitors; colorants; strengthening additives such as glass fibers; abrasion resistant materials such as glass beads; plasticizers to adjust elasticity and hardness; and other additives. The selection of plastic materials and associated additives will be influenced by many factors, including manufacturing process, cost, durability, and other relevant factors known to those skilled in the art of plastic fabricating.

Alternative embodiments are fabricated using different materials and manufacturing techniques, for exemplary and non-limiting purpose including die casting of metal parts, and subtractive processes such as machining or additive processes such as three-dimensional printing. Likewise implement head 20 and terminal handle 35 can be made of the same or similar materials as above, or any other materials as would be recognized as suitable by those skilled in the art.

When the associated internal ramped cylindrical compression wedges 50 are fully secured, desirably there will be sufficient friction or interference generated to keep cylindrical handle segments 42, 44 from detaching from cylindrical handle segment receiver sockets 13 and 14, terminal handle 30, or implement head 20, or from spinning about their respective longitudinal axes. In some embodiments, for exemplary and non-limiting purpose, there will be a generation of a sufficient static coefficient of friction between cylindrical handle segments 42, 44 and their associated internal ramped cylindrical compression wedges 50 to resist the application of ordinary rotational forces applied thereto during use. In other words, in these embodiments there will simply be a high coefficient of friction again for exemplary and non-limiting purpose such as would be generated by:

one or both of cylindrical handle segments 42, 44 and their associated internal ramped cylindrical compression wedges 50 having rough or uneven surfaces; and/or a selection of materials having very high intrinsic coefficients of friction. In other embodiments, in addition to or instead of generation of sufficient friction, there will be a generation of elastic or inelastic deformation of ones of or all of cylindrical handle segments 42, 44 and their associated internal ramped cylindrical compression wedges 50. In such embodiments, there will be enough force generated during the activation of internal ramped cylindrical compression wedges 50 to deform either or each of cylindrical handle segments 42, 44 and internal ramped cylindrical compression wedges 50.

Figure 9:
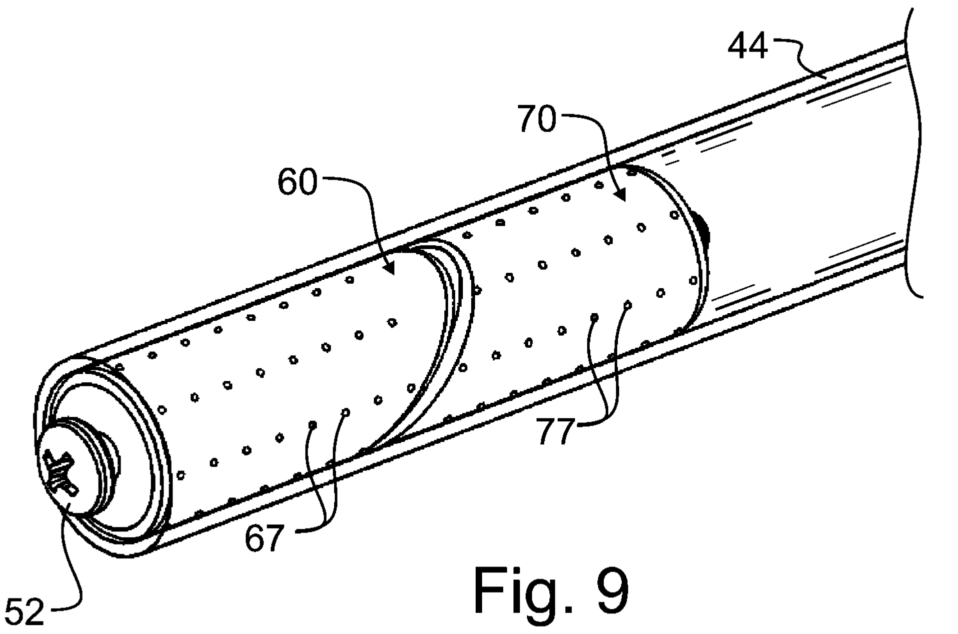
FIG. 9 illustrates a first alternative embodiment internal ramped cylindrical compression wedge incorporating anti-rotational features, in combination with a cylindrical handle segment, from a side elevational view.

While in some embodiments such elastic or inelastic deformation will occur without the provision of any further features than those illustrated in FIGS. 1-5 and FIG. 8, in some embodiments other features are provided that ensure or amplify such elastic or inelastic deformation. As illustrated in FIG. 9, one or as illustrated a large plurality of anti-rotation dimples 67, 77 are provided that create a surface roughness or texture to the exterior of longitudinally stationary wedge 60 and longitudinally reciprocating wedge 70, respectively. These dimples can take on any suitable geometry, ranging for exemplary and non-limiting purpose from hemispherical to conical. The selection of a particular geometry will be based upon the materials used in the fabrication of anti-rotation dimples 67, 77 and cylindrical handle segments 42, 44, and also upon whether the deformation is intended to be elastic or inelastic. Noteworthy here is that inelastic deformation translates into permanent deformation of one or more of the components, meaning that inelastic deformation has a limited number of available disconnection and reconnection cycles before the connection will no longer perform as intended. In some embodiments, the number of available disconnection and reconnection cycles will only be one, meaning at the time of original assembly. In other embodiments where the deformation is elastic, the number of available disconnection and reconnection cycles can be very large or even effectively unlimited.

Figure 10:
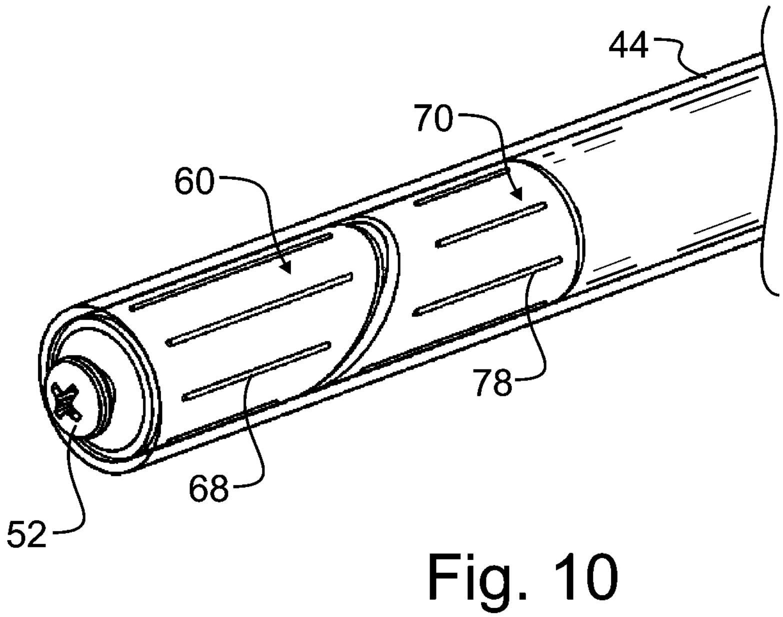
FIG. 10 illustrates a second alternative embodiment internal ramped cylindrical compression wedge incorporating anti-rotational features, in combination with a cylindrical handle segment, from a side elevational view.

FIG. 10 illustrates a second alternative embodiment anti-rotation feature, in the form of anti-rotation ridges 68, 78. Such ridges will tend to have greater contact surface area and thereby less force concentration at the peaks of the ridges, meaning that in some embodiments it is easier to design for elastic deformation using anti-rotation ridges 68, 78 than with anti-rotation dimples 67, 77.

In yet other alternative embodiments, permanent attachment is achieved through the use of some combination of permanently deformable wedge bodies 62, 72 and permanently deformable cylindrical handle segments 42, 44 that lead to an irreversible deformation and binding between the wedge bodies 62, 72 or between the wedge bodies 62, 72 and cylindrical handle segments 42, 44. For exemplary and non-limiting purpose, in such latter embodiments wedge bodies 62, 72 are driven into and permanently deform cylindrical handle segments 42, 44, permanently embedding them therein.

Different fasteners and components are also provided in alternative embodiments to obtain varying degrees of removable or permanent attachment. For exemplary and non-limiting purpose, alternative fasteners such as screws and molded-in threads will be implemented in some alternative embodiments to replace fastener 51. Semipermanent attachment will be accomplished in other alternative embodiments with commercially available fasteners such as push caps, snap, clip features, or the like, as long as the selected fasteners extend sufficiently longitudinally and are able to generate sufficient force to cause the desired splaying of wedges 60, 70. Permanent attachment will be accomplished in yet other alternative embodiments with rivets and the like.

The work purpose for preferred embodiment hand tool 1 is determined by the geometry and construction of an implement secured within implement head 20. As illustrated, implement head 20 comprises a rake blade 22. Nevertheless, in alternative embodiments implement head 20 will for exemplary and non-limiting purpose comprise implement heads and handle assemblies related to agricultural, lawn, garden, snow, industrial, general maintenance and other common household and professional tools. Some more specific non-limiting examples of alternative embodiment implement heads include a hoe or scraper head, a scraper shovel blade, a snow shovel head, and a specialized hoe blade, though a myriad of implements will be used in alternative embodiments.

As may be apparent from some of the Figures, driver head 52 is on one side of an anchor, and shank 53 passes through the anchor. To describe this from the Figures, driver head 52 is visible in FIGS. 1 and 3 on the front face of implement head 20, while shank 53 passes through rake 22. At the time of initial assembly, fastener 51 will be inserted through a mounting hole 26 in rake 22 visible in FIG. 11 and into and against either one of threaded tube 86 or mounting plate 84 to the position visible in FIGS. 1, 4 and 12. In the preferred embodiment illustrated in FIG. 12, driver head 52 engages with threaded tube 86. On the opposite side of mounting plate 84 from rake 22 and driver head 52, longitudinally stationary wedge 60 is slipped onto unthreaded shank 53. Next, longitudinally reciprocating wedge 70 is slipped onto the threads 54, and finally threaded nut 55 is threaded onto threads 54, thereby capturing both longitudinally stationary wedge 60 and longitudinally reciprocating wedge 70 onto fastener 51.

In preferred embodiment hand tool 1, a first coupler half that is defined in this preferred embodiment by internal ramped cylindrical compression wedge 50 selectively engages the terminal end of handle segment 42. Other suitable means and apparatuses are used in alternative embodiments, including but not limited to nuts and clips such as illustrated and described in our commonly owned U.S. Pat. No. 11,780,073 incorporated herein above by reference.

A second coupler half that is defined in this preferred embodiment by implement coupler 80 selectively engages the first coupler half. The second coupler half preferably includes an implement coupler that facilitates ready attachment and removal of various implements. The second coupler half includes: a coupling face, for exemplary and non-limiting purpose such as a plate that extends in a plane transverse to the handle longitudinal axis; and a threaded post protruding perpendicular or normal to the plate. A tool implement head such as implement head 20 in the preferred embodiment has a coupling face, for exemplary and non-limiting purpose such as a mounting plate that is placed adjacent the second coupler half plate, with the threaded post passing through the tool implement head post. A jam nut manually threads onto the threaded post, and applies force to squeeze the tool implement head planar face between the jam nut and first coupler half plate.

In the preferred embodiment, implement coupler 80 that serves as the second coupler half includes a mounting plate 84, threaded tube 86, and anti-rotation protrusion 88. Either at the factory or as an initial assembly step by an end user, fastener 51 is passed through the interior of threaded tube 86, the head of fastener 51 engaging mounting plate 84 and the threads engaging threaded nut 55. Fastener 51 is tightened as desired, as described herein above to either elastically or through permanent deformation engage securely with handle segment 42.

A suitable implement head 20, such as rake 22 illustrated in the preferred embodiment, includes a mounting plate 24 having a mounting hole 26 and anti-rotational slot 28. Slot 28 is offset from the axis defined by the longitudinal axis of fastener 51.

Figure 11:
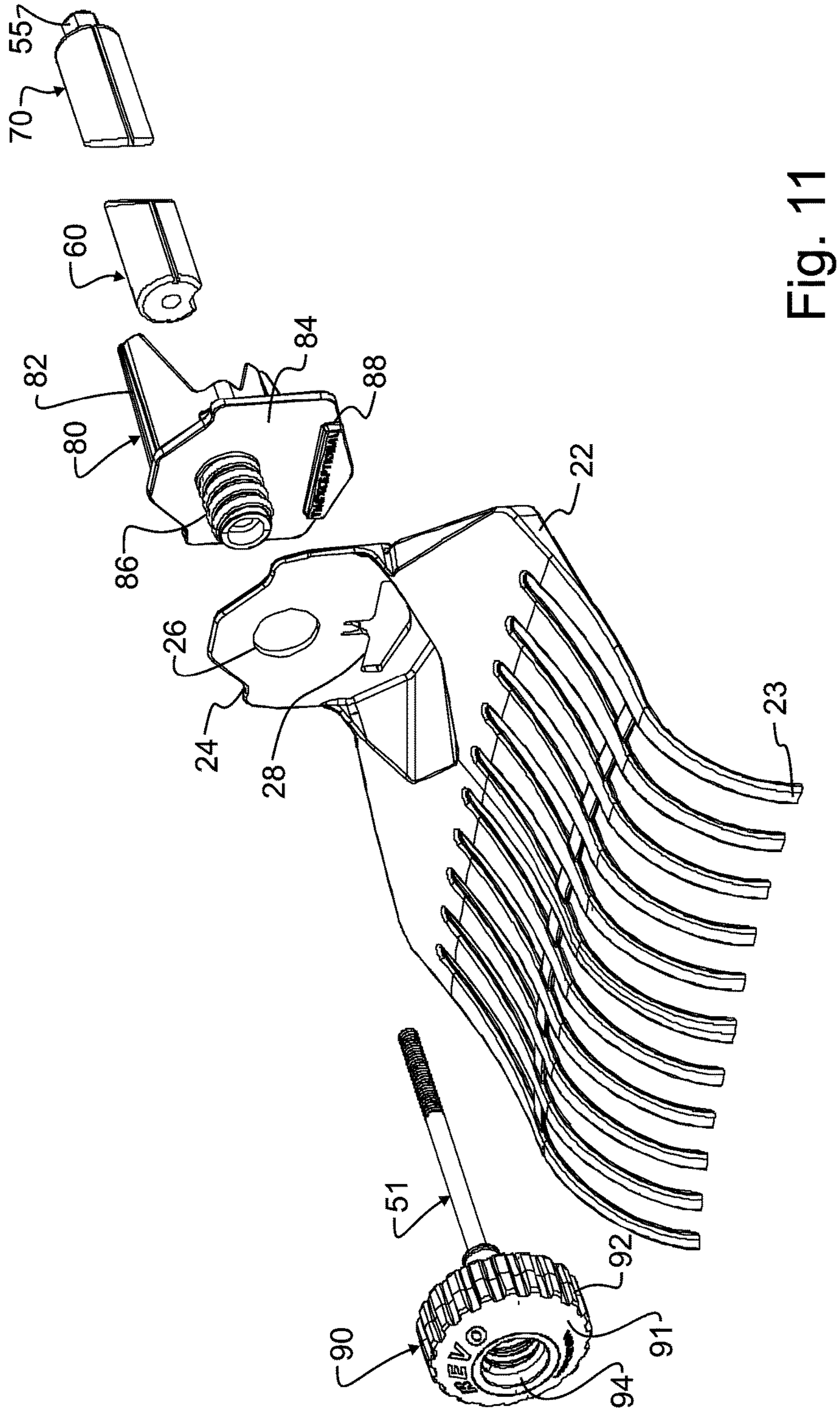
FIG. 11 illustrates a preferred embodiment implement head, including a rake and a cylindrical wedge, as illustrated in the preferred embodiment hand tool with internal ramped cylindrical compression wedge of FIGS. 1-5, from an exploded assembly view.
Figure 12:
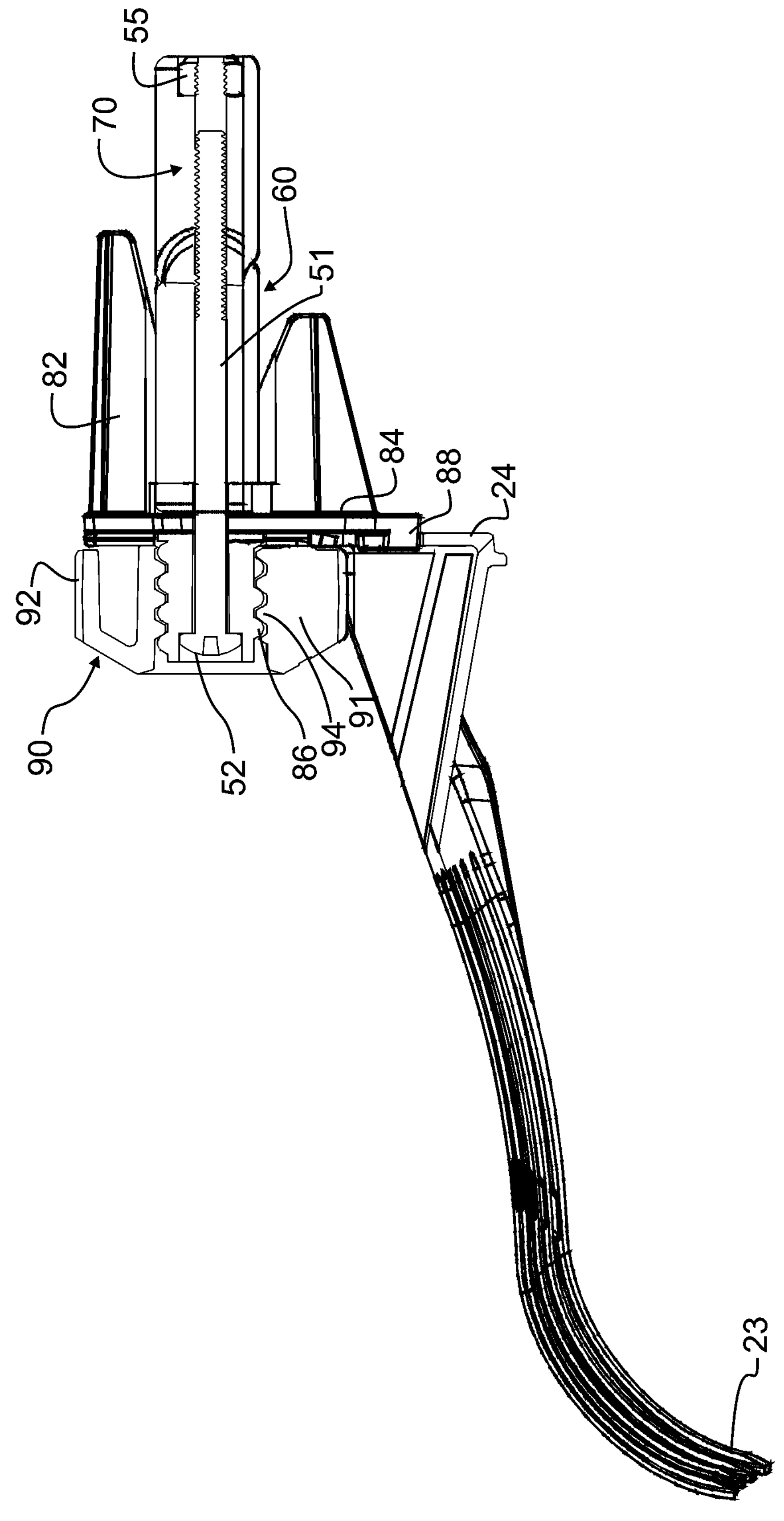
FIG. 12 illustrates the preferred embodiment implement head of FIG. 11, including a rake and cylindrical wedge, in assembled configuration from a vertical plane sectional view.

Assembly, which is best understood with reference to FIGS. 11 and 12, begins by aligning mounting hole 26 to circumscribe threaded tube 86. Next, mounting plate 24 is slid onto implement coupler 80 until mounting plate 24 abuts with mounting plate 84. In order to reach this destination, slot 28 must also align with and circumscribe anti-rotation protrusion 88. Note that slot 28 and anti-rotation protrusion 88 may each take any suitable geometry that allows one to engage with the other. Since slot 28 is offset from the axis defined by the longitudinal axis of fastener 51, this engagement with anti-rotation protrusion 88 prevents rotation from occurring between rake 22 and implement coupler 80 about the longitudinal axis of fastener 51.

In alternative embodiments, other anti-rotation members such as fasteners or couplers are radially displaced from and prevent rotation about the threaded tube 86 longitudinal axis are provided. For exemplary and non-limiting purpose, in some alternative embodiments a suitable fastener such as a screw hole or threaded bolt hole is provided in mounting plate 84, and the suitable fastener is passed through mounting plate 24 and secured into the mounting plate 84 screw hole or threaded bolt hole.

To secure rake 22 to implement coupler 80, an implement affixing knob 90 is provided. Knob body 91 provides a textured outer diameter 92 for enhanced gripping. Knob body 91 also has a threaded bore 94. Threaded bore 94 is configured to thread onto threaded tube 86, and in the process press rake 22 snugly against mounting plate 84. The provision of implement affixing knob 90 ensures ready manual affixing and removal of various implements from implement coupler 80.

Figure 13:
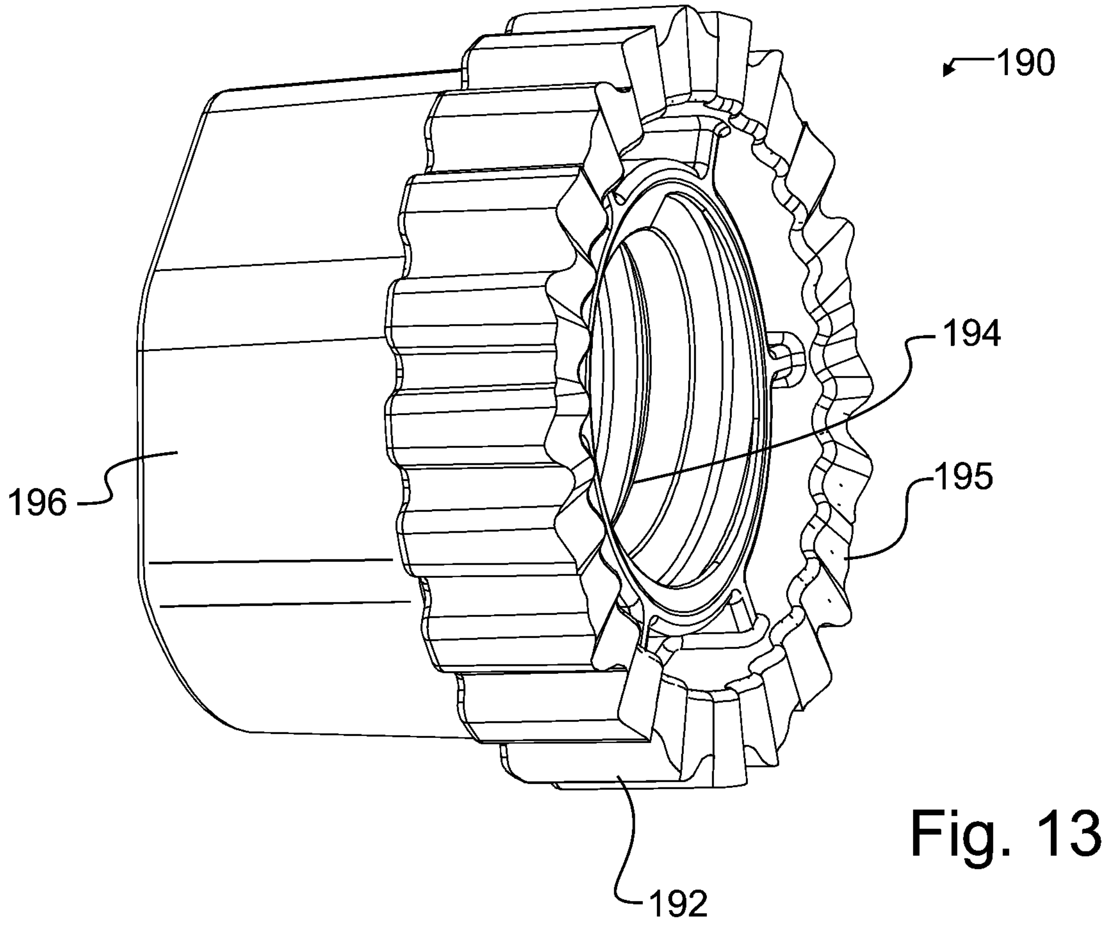
FIG. 13 illustrates an alternative embodiment implement affixing knob from a projected view.

FIG. 13 illustrates an alternative embodiment implement affixing knob 190. Similar to knob 90, a knob body 191 provides a textured outer diameter 192 for enhanced gripping. Knob body 191 also has a threaded bore 194. Threaded bore 194 is configured to thread onto threaded tube 86, and in the process press rake 22 snugly against mounting plate 84. However, knob 190 adds a wavy contact surface 195 that is configured to engage with the generally planar surface of mounting plate 84. In addition, an extension 196 extends radially by an amount less than textured outer diameter 192, and preferably has one or more flat faces thereon. In some embodiments, extension 196 is hexagonal or of other suitable geometry that facilitates the use of tools such as wrenches or pliers. Extension 196 enables a person to more easily and rapidly spin implement affixing knob, particularly where there is limited space available, and can also be beneficial in those instances where an end user has limited strength and dexterity and so requires or desires to use a wrench or pliers to better tighten knob 190 and thereby secure mounting plate 24 between wavy contact surface 195 and mounting plate 84.

One very desirable characteristic of most of preferred embodiment hand tool 1 is that it may be manufactured using a simple A/B two part mold tool. In other words, the geometry only requires two mold pieces that are closed by pressing the A and B mold parts together. Next, plastic is injected into the mold, and then the plastic is allowed to briefly cool. The mold parts are then separated from each other, and the molded plastic part is then removed from the mold for any further treatments or processing as required or desired. In order for a mold to be compatible with this simple A/B two parts mold tool, the geometry of the part being molded must permit the mold parts to be removed, preferably in a linear and opposed direction. By designing the parts as illustrated, the A and B mold parts can be designed to travel in a direction parallel to the longitudinal axis of cylindrical handle segment receiver sockets 13, 14 and cylindrical handle segments 42, 44. Those skilled in the molding art will understand the processes and implications from a reading of the foregoing in light of the illustrations. As a result of this A/B two parts molding, the mold tooling costs and production complexity are both significantly decreased, and yet, as apparent from the illustrations herein, the resulting preferred embodiment hand tool 1 may still be very feature rich.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. A hand tool comprising:

a longitudinally extensive handle;

a first coupler half selectively secured to and terminating said handle;

a second coupler half selectively removable from said first coupler half and having a mounting stop, a threaded tube, a central axis of said threaded tube that defines a second coupler half longitudinal axis, and wherein said threaded tube comprises threads helically wound around said second coupler half longitudinal axis, and an anti-rotation member displaced radially from said second coupler half longitudinal axis;

an implement affixing knob having a knob body, an outer surface configured to be manually grasped and rotated, and a threaded bore configured to selectively thread on to said threaded tube; and a fastener passing through a hollow longitudinal internal passage within said threaded tube from said second coupler half to said first coupler half, said fastener selectively securing said first and second coupler halves together;

wherein said fastener further comprises a bolt; and wherein said first coupler half is located at least in part within said longitudinally extensive handle and comprises a threaded ramped wedge configured to expand radially when said bolt is rotated in a first direction about said second coupler half longitudinal axis and configured to contract radially when said bolt is rotated in a second direction opposite to said first direction about said second coupler half longitudinal axis.

2. The hand tool of claim 1, wherein said mounting stop comprises a plate extending in a plane transverse to said second coupler half longitudinal axis.

3. The hand tool of claim 1, wherein said threads further comprise a semi-circular thread form.

4. The hand tool of claim 1, wherein said threaded ramped wedge comprises:

a first wedge; and a second wedge;

said first wedge and said second wedge configured to slide relative to each other responsive to said rotation of said bolt.

5. The hand tool of claim 4, further comprising a threaded body affixed to said second wedge and threaded about said bolt, wherein said second wedge reciprocates longitudinally along an axis parallel to said second coupler half longitudinal axis responsive to rotation of said bolt.

6. The hand tool of claim 1, further comprising an implement head releasably secured between said implement affixing knob and said second coupler mounting stop.

7. The hand tool of claim 1, wherein said longitudinally extensive handle comprises at least one cylindrical handle segment; and said hand tool further comprises a plurality of internal ramped cylindrical compression wedges affixing at least one of a handle, an implement, and an offset coupler to said at least one cylindrical handle segment.

8. The hand tool of claim 7, further comprising:

an offset connector; and at least two cylindrical handle segments.

9. The hand tool of claim 8, further comprising a terminal hand grip affixed to said longitudinally extensive handle distal to said second coupler half.

10. The hand tool of claim 1, wherein said implement affixing knob outer surface further comprises a textured surface.

11. The hand tool of claim 10, wherein said implement affixing knob further comprises a longitudinal extension parallel to said second coupler half longitudinal axis, said longitudinal extension having at least one generally flat surface.

12. The hand tool of claim 1, wherein said anti-rotation member further comprises a protrusion displaced radially from said second coupler half longitudinal axis and rising from said mounting stop.

13. The hand tool of claim 1, wherein said anti-rotation member further comprises a fastener hole formed in said mounting stop and displaced radially from said second coupler half longitudinal axis.

* * * * *